US011481378B1

(12) United States Patent
Shackell

(10) Patent No.: US 11,481,378 B1
(45) Date of Patent: Oct. 25, 2022

(54) METHOD AND SYSTEM FOR SERVICING QUERY REQUESTS USING DOCUMENT-BASED METADATA

(71) Applicant: Anaplan, Inc., San Francisco, CA (US)

(72) Inventor: Thomas Francis Shackell, Leeds (GB)

(73) Assignee: Anaplan, Inc., San Francisco, CA (US)

( * ) Notice: Subject to any disclaimer, the term of this patent is extended or adjusted under 35 U.S.C. 154(b) by 179 days.

(21) Appl. No.: 16/176,530

(22) Filed: Oct. 31, 2018

(51) Int. Cl.
*G06F 16/23* (2019.01)
*G06F 16/93* (2019.01)
*G06F 16/245* (2019.01)

(52) U.S. Cl.
CPC ........ *G06F 16/2365* (2019.01); *G06F 16/245* (2019.01); *G06F 16/93* (2019.01)

(58) Field of Classification Search
CPC ..... G06F 16/2365; G06F 16/245; G06F 16/93
USPC ........................................................ 707/690
See application file for complete search history.

(56) References Cited

U.S. PATENT DOCUMENTS

| | | | |
|---|---|---|---|
| 6,212,515 B1 | 4/2001 | Rogers | |
| 6,381,605 B1 | 4/2002 | Kothuri | |
| 6,920,454 B1 | 7/2005 | Chan | |
| 7,293,254 B2* | 11/2007 | Bloesch | G06F 9/4488 717/108 |
| 7,877,376 B2 | 1/2011 | Thiyagarajan et al. | |
| 7,941,408 B2* | 5/2011 | Sinha | G06F 16/219 707/685 |
| 7,958,457 B1 | 6/2011 | Brandenberg et al. | |
| 8,151,056 B2 | 4/2012 | Gould | |
| 8,589,445 B2 | 11/2013 | Gould | |
| 9,411,853 B1 | 8/2016 | Dovrtel et al. | |
| 9,529,892 B2 | 12/2016 | Tibrewal | |
| 9,552,242 B1* | 1/2017 | Leshinsky | G06F 11/1474 |
| 9,710,501 B2 | 7/2017 | Walker | |
| 10,298,661 B2* | 5/2019 | Harries | H04L 67/10 |
| 10,467,245 B2 | 11/2019 | Sirer et al. | |
| 10,929,428 B1 | 2/2021 | Brahmadesam et al. | |
| 11,016,947 B1 | 5/2021 | Patel et al. | |
| 2003/0009458 A1 | 1/2003 | Nakano et al. | |
| 2003/0009551 A1 | 1/2003 | Benfield et al. | |
| 2003/0009552 A1 | 1/2003 | Benfield et al. | |
| 2004/0210608 A1 | 10/2004 | Lee et al. | |
| 2005/0005116 A1 | 1/2005 | Yuen et al. | |
| 2005/0120062 A1* | 6/2005 | Sinha | G06F 16/219 |
| 2006/0184519 A1 | 8/2006 | Smartt | |
| 2009/0055266 A1 | 2/2009 | Brody et al. | |

(Continued)

OTHER PUBLICATIONS

International Search Report and Written Opinion issued in corresponding application No. PCTUS2019059235, dated Feb. 4, 2020. (15 pages).

(Continued)

*Primary Examiner* — Ashish Thomas
*Assistant Examiner* — Nargis Sultana
(74) *Attorney, Agent, or Firm* — Chamberlain, Hrdlicka, White, Williams & Aughtry

(57) ABSTRACT

In general, the invention relates to a method for servicing query requests in a distributed system. The method includes generating a data flow graph for a data model using a plurality of metadata documents, where each of the metadata documents is associated with a consistency zone, and servicing a query request using the data flow graph and data associated with the data model.

21 Claims, 17 Drawing Sheets

(56) References Cited

U.S. PATENT DOCUMENTS

| | | | |
|---|---|---|---|
| 2009/0249290 A1* | 10/2009 | Jenkins | G06F 9/451 717/109 |
| 2010/0009661 A1 | 1/2010 | Zhu | |
| 2010/0100571 A1* | 4/2010 | Gould | G06Q 10/04 707/803 |
| 2010/0131715 A1* | 5/2010 | Gould | G06F 40/18 711/129 |
| 2011/0047146 A1 | 2/2011 | Scott | |
| 2011/0264679 A1 | 10/2011 | Dettinger et al. | |
| 2011/0293096 A1 | 12/2011 | Reilly | |
| 2012/0030293 A1 | 2/2012 | Bobotek | |
| 2012/0198198 A1* | 8/2012 | Gould | G06F 16/283 711/170 |
| 2012/0290700 A1 | 11/2012 | Li et al. | |
| 2013/0110911 A1* | 5/2013 | Chow | G06F 16/248 709/203 |
| 2013/0117257 A1* | 5/2013 | Meijer | G06F 16/2453 707/719 |
| 2013/0311422 A1* | 11/2013 | Walker | G06F 16/217 707/609 |
| 2014/0032504 A1* | 1/2014 | Golab | G06F 16/2365 707/690 |
| 2014/0156638 A1* | 6/2014 | Joshi | G06F 16/256 707/722 |
| 2014/0180653 A1 | 6/2014 | Belmans | |
| 2014/0215019 A1 | 7/2014 | Ahrens | |
| 2014/0229470 A1* | 8/2014 | Smith-Mickelson | G06F 16/2228 707/725 |
| 2014/0279920 A1 | 9/2014 | Madhavarapu et al. | |
| 2014/0304339 A1 | 10/2014 | Hamilton | |
| 2014/0365523 A1* | 12/2014 | Wagner | G06F 16/435 707/770 |
| 2015/0012539 A1* | 1/2015 | Mchugh | G06F 16/2255 707/737 |
| 2015/0058324 A1 | 2/2015 | Kauwe | |
| 2015/0067556 A1* | 3/2015 | Tibrewal | G06F 3/04847 715/765 |
| 2015/0100574 A1 | 4/2015 | Presta et al. | |
| 2015/0149570 A1 | 5/2015 | Harries et al. | |
| 2015/0347450 A1 | 12/2015 | Phelan | |
| 2016/0019275 A1 | 1/2016 | Mosko | |
| 2016/0050269 A1* | 2/2016 | Botticelli | H04L 67/12 709/218 |
| 2016/0085809 A1* | 3/2016 | de Castro Alves | G06F 16/24568 707/736 |
| 2016/0124857 A1 | 5/2016 | Parr | |
| 2016/0217519 A1 | 7/2016 | Kozat et al. | |
| 2016/0255139 A1* | 9/2016 | Rathod | H04L 67/10 709/203 |
| 2016/0321376 A1* | 11/2016 | Taylor | G06F 16/9024 |
| 2016/0350363 A1 | 12/2016 | Raja et al. | |
| 2017/0012815 A1 | 1/2017 | Nekrestyanov et al. | |
| 2017/0024912 A1* | 1/2017 | de Castro Alves | G06F 16/24568 |
| 2017/0255524 A1* | 9/2017 | McGrath | G06F 11/1451 |
| 2017/0364699 A1 | 12/2017 | Goldfarb et al. | |
| 2018/0088788 A1 | 3/2018 | Cheung et al. | |
| 2018/0096027 A1 | 4/2018 | Romero et al. | |
| 2018/0173767 A1 | 6/2018 | Langseth et al. | |
| 2018/0232422 A1* | 8/2018 | Park | G05D 23/1931 |
| 2018/0246926 A1* | 8/2018 | Altaf | G06F 16/215 |
| 2018/0260409 A1* | 9/2018 | Sundar | G06F 16/148 |
| 2018/0300350 A1* | 10/2018 | Mainali | G06F 16/9027 |
| 2019/0147078 A1* | 5/2019 | Dageville | G06F 21/602 707/695 |
| 2019/0236130 A1 | 8/2019 | Li et al. | |
| 2019/0236215 A1* | 8/2019 | Agarwal | G06F 16/9014 |
| 2019/0294724 A1* | 9/2019 | Michelis | G06F 16/24534 |
| 2019/0325737 A1 | 10/2019 | Moustafa et al. | |
| 2020/0104181 A1* | 4/2020 | Pyati | G06F 9/5038 |
| 2020/0104362 A1 | 4/2020 | Yang et al. | |
| 2020/0151577 A1* | 5/2020 | Ogawa | G06N 5/046 |
| 2021/0011914 A1 | 1/2021 | Pearson et al. | |

OTHER PUBLICATIONS

Lars George, HBase: The Definitive Guide, HBase: The Definitive Guide, Sep. 23, 2011, 1-524, ISBN: 978-1-4493-9610-7, O'Reilly Media, Incorporated, Sebastopol, XP055662278.

Silu Huang et al., OrpheusDB: Bolt-on Versioning for Relational Databases, OrpheusDB: Bolt-on Versioning for Relational Databases, Mar. 7, 2017, rxiv.org, Cornell University Library, 2010 Lin Library Cornell University Ithaca, NY 14853, DOI: 10.14778/3115404.3115417, Cornell University Library, 2010 Lin Library Cornell University, NY 14853.

Lars George, HBase: The Definitive Guide, HBase: The Definitive Guide, Sep. 23, 2011, 1-524, ISBN: 978-1-44 93-9610-7, O'Reilly Media, Incorporated, Sebastopol, XP055662278 (115 pages).

Silu Huang et al, OrpheusDB: Bolt-on Versioning for Relational Databases, OrpheusDB: Bolt-on Versioning for Relational Databases, Mar. 7, 2017, rxiv.org, Cornell University Library, 2010 Lin Library Cornell University Ithaca, NY 14853, DOI: 10.14778/3115404.3115417, Cornell University Library, 2010 Lin Library Cornell University, NY 14853 (63 pages).

International Search Report and Written Opinion dated Dec. 8, 2020, for PCT/US2020/054157 filed on Oct. 2, 2020.

* cited by examiner

METHOD AND SYSTEM FOR SERVICING QUERY REQUESTS USING DOCUMENT-BASED METADATA

BACKGROUND

Companies collect large amounts of data about their own operations. This data is then analyzed to determine, among other things, how to improve the operation of the company and/or how to plan for the future operation of the company. The traditional approach to efficiently analyzing data (or data sets) is to load the data (or data sets) into memory and then analyze the in-memory data. As the size of data sets that need to be analyzed has grown, the traditional approach has become impractical or at a minimum cost prohibitive. Specifically, in order to keep all of the data in memory, a larger amount of memory needs to be provisioned and additional overhead needs to be expended in order to ensure that the data in the memory is current. Further, as the size of the data set increases, it is difficult to efficiently and effectively scale the hardware and software infrastructure necessary to analyze the larger data set.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

SUMMARY

Figure 1A:
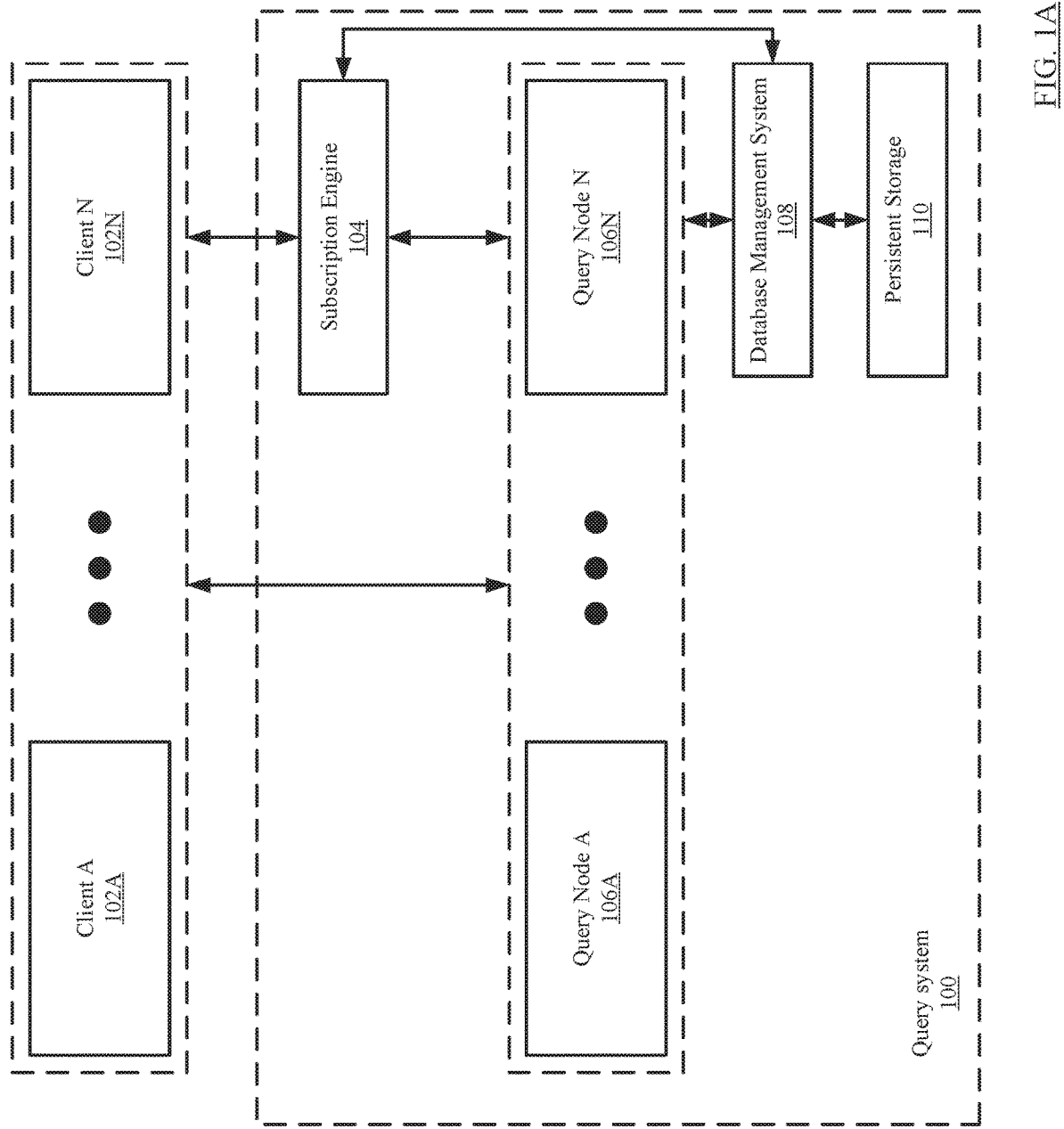
FIG. 1A shows a diagram of a system in accordance with one or more embodiments of the invention.

In general, in one aspect, the invention relates to a method for servicing query requests. The method includes generating a data flow graph for a data model using a plurality of metadata documents, wherein each of the metadata documents is associated with a consistency zone, and servicing a query request using the data flow graph and data associated with the data model.

In general, in one aspect, the invention relates to a non-transitory computer readable medium comprising computer readable program code, which when executed by a computer processor enables the computer processor to perform a method for servicing query requests, the method includes generating a data flow graph for a data model using a plurality of metadata documents, wherein each of the metadata documents is associated with a consistency zone, and servicing a query request using the data flow graph and data associated with the data model.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing distributed calculations. More specifically, embodiments of the invention relate to distributing management of the data to be analyzed across query nodes and also distributing the servicing of a query request across one or more query nodes. One or more embodiments of the invention implement document-based metadata, where the metadata is stored as a series of events in various metadata documents. By storing metadata as a series of events, the specific state of the metadata does not need to be maintained; rather, the state the metadata at any point in time may be determined by replaying the events in the appropriate metadata document. Further, each event that is performed on metadata (i.e., any metadata in the system) is stored in only one metadata document and each metadata document is considered a separate record namespace. This enables a query node to obtain an entire metadata document with no or minimal additional lookups from persistent storage. This improves performance of the query system by limiting the requests for metadata that are made to the persistent storage. Further, by storing the events associated with the metadata as opposed to different versions of the metadata, embodiments of the invention provide an efficient storage mechanism to tracking multiple versions of metadata.

FIG. 1A shows a diagram of a system in accordance with one or more embodiments of the invention. The system includes a query system (100) interacting with one or more clients (102A, 102N). The components illustrated in FIG. 1A may be connected via any number of operable connections supported by any combination of wired and/or wireless networks. Each component of the system of FIG. 1A (including the individual components in the query system) may be operably connected via any combination of wired and/or wireless connections. Each component of the system of FIG. 1A is discussed below.

In one embodiment of the invention, clients (102A, 120N) are configured to issue query request to the query system (or to a specific query node in the query system), to receive query responses, and to interact with the subscription engine (described below).

In one or more embodiments of the invention, zero, one or more clients (102A, 102N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 5.

In one or more embodiments of the invention, the zero, one or more clients (102A, 102N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

In one or more embodiments of the invention, query system (100) includes one or more query nodes (106A, 106N), a database management system (DBMS) (108), persistent storage (110), and a subscription engine (104). Each of these components is described below.

Figure 1B:
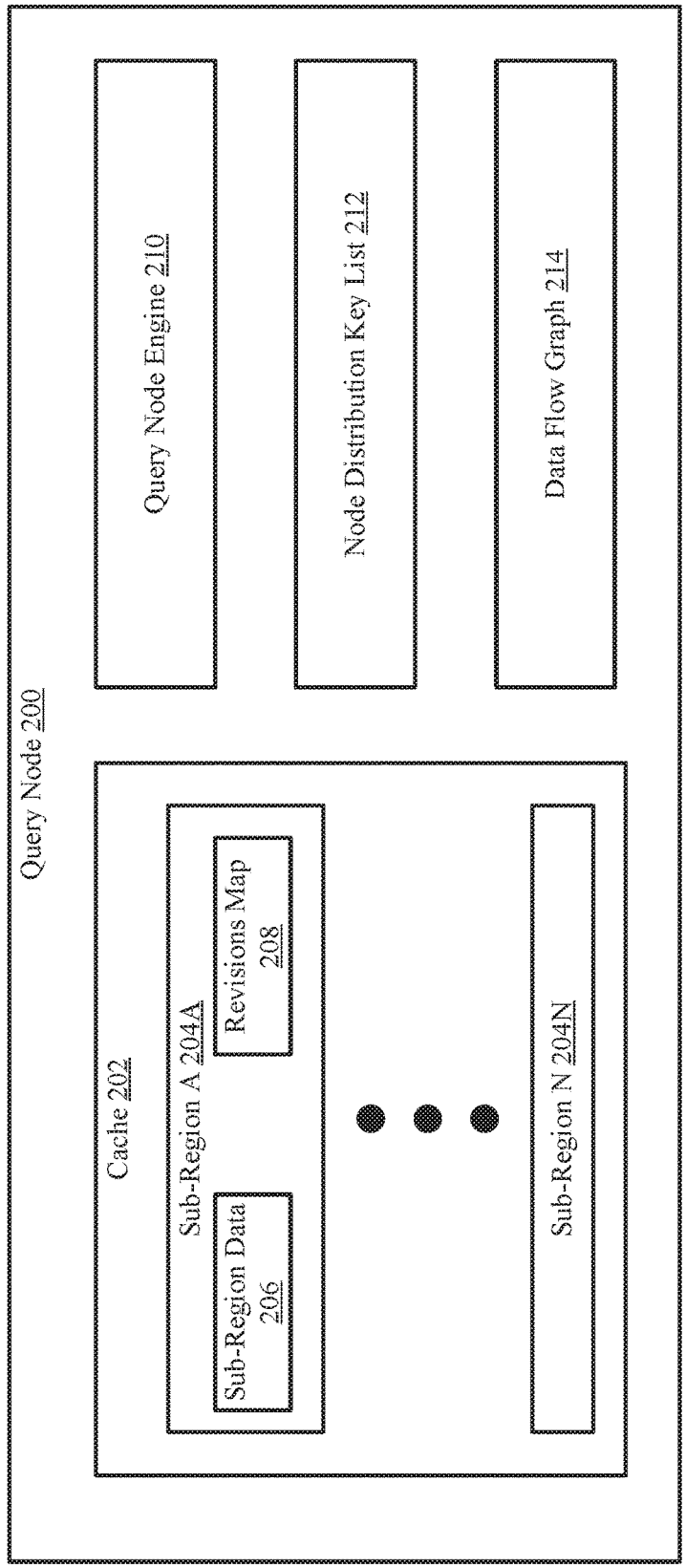
FIG. 1B shows a diagram of a query node in accordance with one or more embodiments of the invention.
Figure 1C:
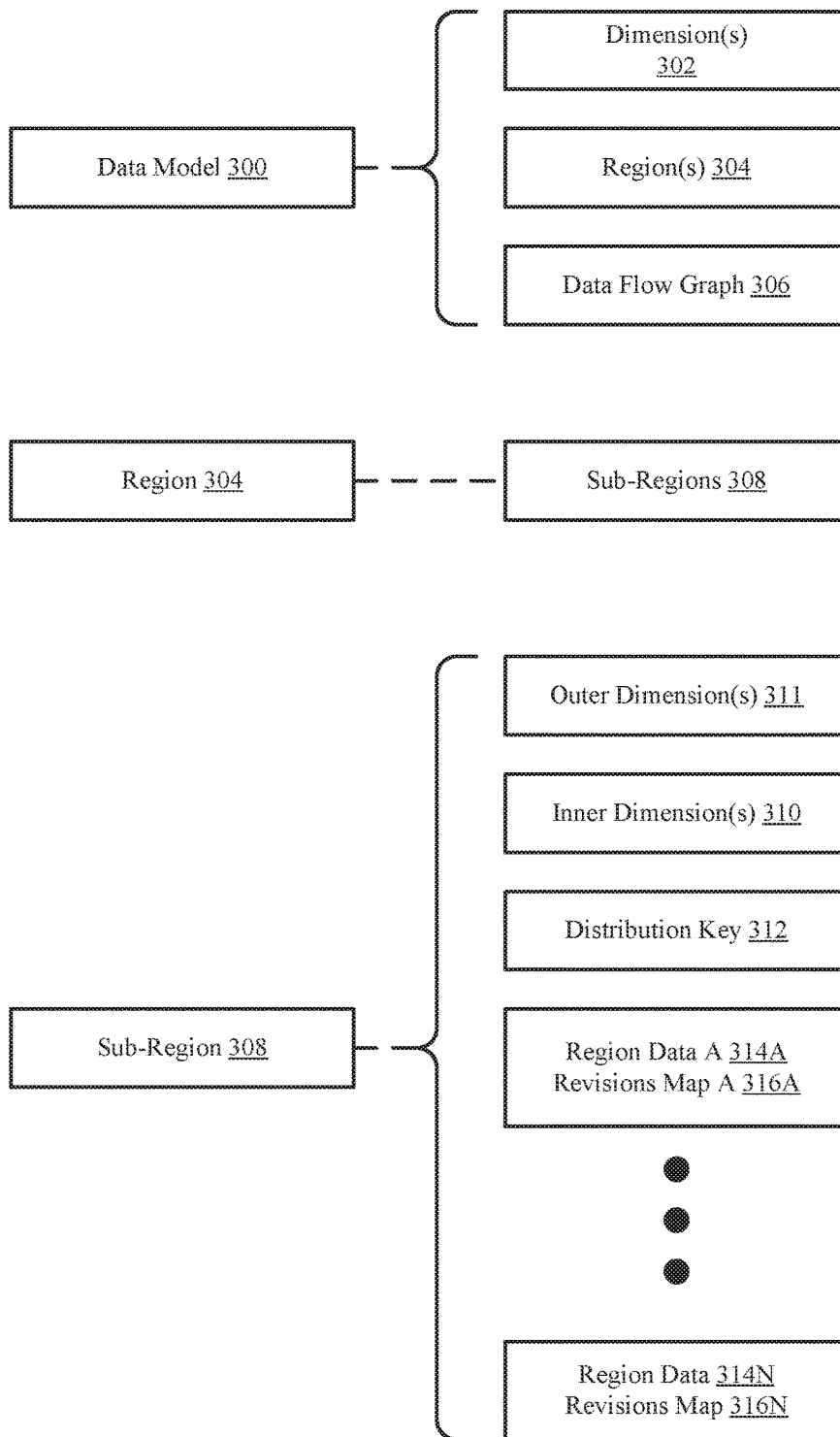
FIG. 1C shows relationships between various elements in the system in accordance with one or more embodiments of the invention.
Figure 2A:
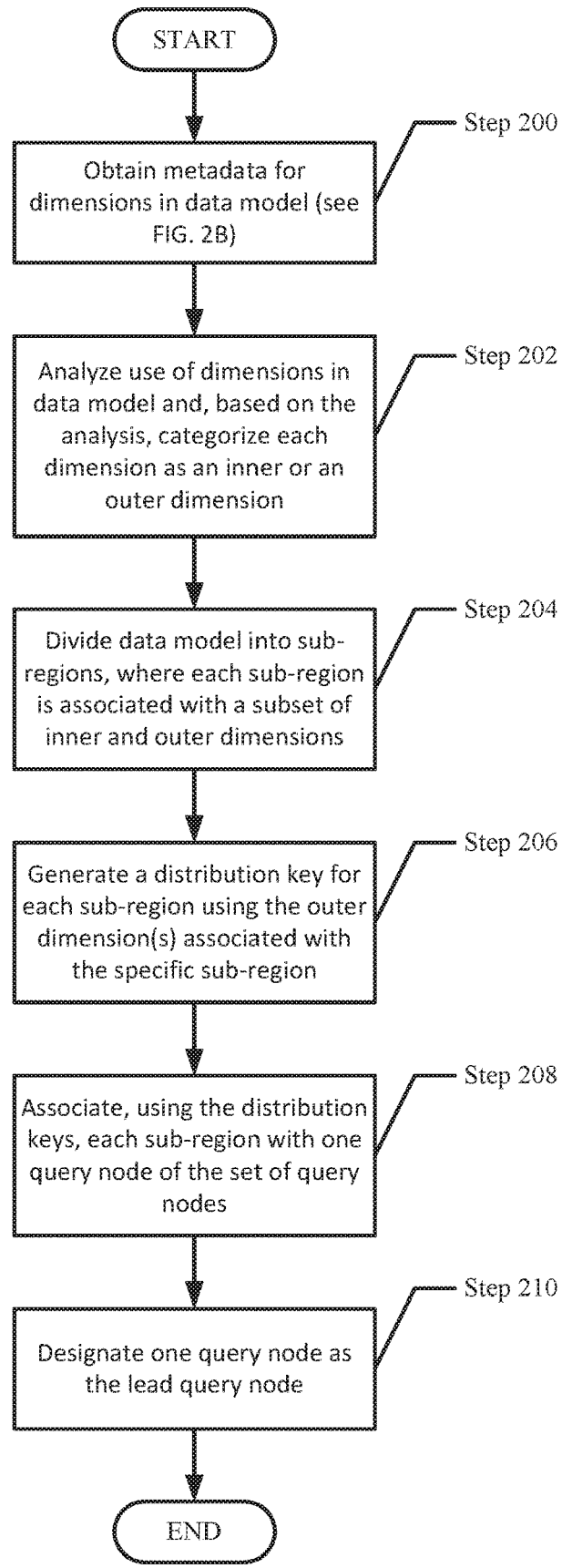
FIG. 2A shows a flowchart of a method of configuring the system in accordance with one or more embodiments of the invention.
Figure 2B:
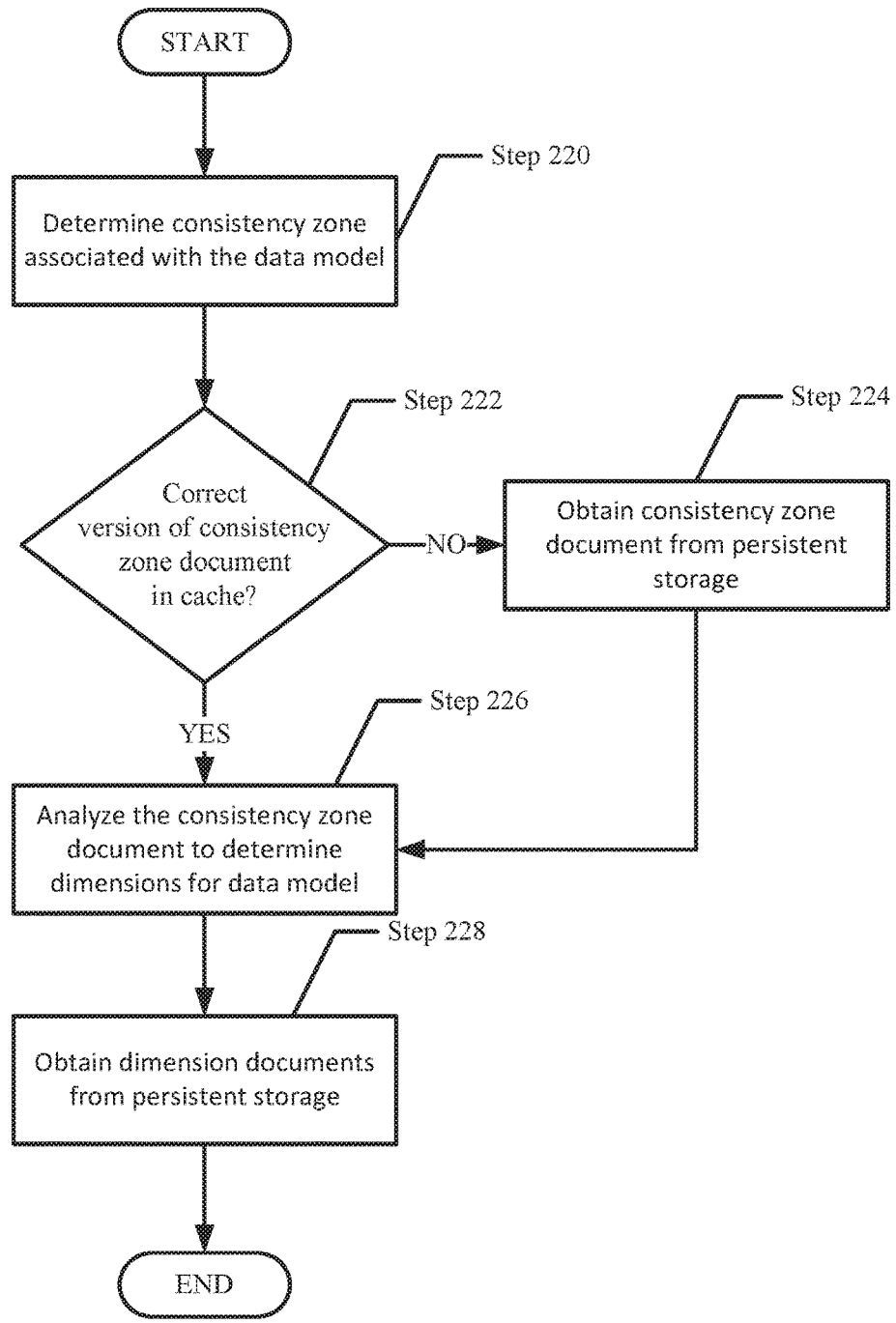
FIG. 2B shows a flowchart of a method for processing metadata documents to determine dimensions in a data model in accordance with one or more embodiments of the invention.

In one or more embodiments of the invention, each query node (106A, 106N) may be configured to perform all or a portion of the method shown in FIGS. 2A-2B in order to configure the query system to service query requested. Further, each query node (106A, 106N) may also be configured to service query requests that may originate from a client (102A, 102N), from the subscription engine (104), and/or for another query node (106A, 106N). Servicing the query requests by the query nodes may be performed recursively in accordance with FIGS. 3A-3C. In addition, each of the query nodes may include functionality to be designated as the lead query node and, when it is designated as such, manage the distribution of sub-regions among the query nodes. Additional detail about the distribution of sub-regions is provided below in, e.g., FIGS. 1B, 1C, and 2A-2B.

In one or more embodiments of the invention, zero, one or more query nodes (106A, 106N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application. For additional details regarding computing devices, refer to FIG. 5.

In one or more embodiments of the invention, the zero, one or more query nodes (106A, 106N) are implemented as logical devices. Each of the logical devices may utilize the computing resources of any number of computing devices and thereby provide the functionality to issue one or more query requests and to receive one more query responses as described throughout this application. Examples of logical devices may include, but are not limited to, virtual machines and containers.

Additional details about the query nodes are provided in FIGS. 1B and 2A-3D below.

In one embodiment of the invention, the database management system (DBMS) (108) provides an interface between other components of the query system (e.g., the query nodes, and the subscription engine) and the persistent storage. More specifically, DBMS (108) is configured to receive requests for data stored in the persistent storage, retrieve the requested data from the persistent storage, and provide the retrieved data to the requesting entity (e.g., a query node). In various embodiments of the invention, the DBMS is also configured to store data (which may be user data or derived data) in the persistent storage and, in certain scenarios, issue notifications to the subscription engine (104) when particular user data is stored in the persistent storage or a request is made to store user data in the persistent storage (additional detail described below). The DBMS (108) may be implemented using any protocol currently known or later developed. Those skilled in the art will appreciate that management software, other than a DBMS may be used without departing from the invention. In one embodiment of the invention, the DBMS may be implemented on a computing device (see e.g., FIG. 5) or as a logical device (e.g., a virtual machine, a container, etc.).

In one embodiment of the invention, the persistent storage (110) includes any form of non-volatile storage media that may store data (e.g., user data and derived data) and metadata. Examples of persistent storage may include, but are not limited to, magnetic storage, optical storage, solid state memory, or any combination thereof. In one embodiment of the invention, the data stored in persistent storage may be user data and derived data. Depending on the implementation of the invention, the persistent storage may store the user data and not store the derived data. Additional detail about the content of the persistent storage is provided in FIGS. 1F-1I.

In one embodiments of the invention, data is denoted as user data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof.

Each piece of data stored in the persistent storage is associated with a sub-region. Further, each piece of data or sub-region may be associated with a version(s). If the data is user data or if the sub-region is a user data sub-region (i.e., a sub-region that only includes user data), then the version (which may be represented as a number) corresponds to the version of the data. The version may be referred to as a revisions map. The initial version of the user data or user data sub-region is, e.g., one and each time there is any change to the user data or the user data sub-region (e.g., an addition, deletion, or modification), then an updated copy of the user data or user data sub-region is stored and the version associated with the updated copy of the user data or user data sub-region is incremented (or updated). In this manner, the persistent storage may include multiple copies of a particular piece of user data or particular user data sub-region each associated with their own version number.

If the data is derived data or if the sub-region is a derived data sub-region (i.e., a sub-region that only includes derived data), then the version (which may be represented as a number) corresponds to the version(s) of the user data that was used to generate (directly or indirectly) the derived data or derived data sub-region. The version or versions of user data from which the derived data is directly or indirectly derived may be referred to as a revisions map. The initial version of the derived data or derived data sub-region is, e.g., one and each time the derived data is recalculated, then the resulting derived data or derived data sub-region is stored and the version(s) of the underlying user data are recorded. In this manner, the persistent storage may include multiple copies of a particular piece of derived data or particular derived sub-region each associated with their own version number. For example, consider a scenario in which, at a first time, derived data (DD1) is calculated using user data A version 1 (UDAv1) and user data B version 2 (UDBv2). Accordingly, the persistent storage stores DD1 along with the following revisions map: [UDAv1, USBv2]. At a second point in time, user data B is updated resulting user data B version 3 being stored in the persistent storage. At a third point in time, the derived data is recalculated (e.g., in response to a query request) the resulting derived data (DD2) may be stored in persistent storage along with the following revisions map: [UDAv1, UDv3]. The example is not intended to limit the scope of the invention.

Continuing with the discussion of FIG. 1A, in one embodiment of the invention, the subscription engine (104) is configured to receive requests from the clients (102A, 102B) to issue query requests when there is a change to the user data associated with the query request. More specifically, each query request is associated target sub-region (e.g., the specific data that is responsive the query request) and each target sub-region is associated (directly or indirectly) with user data. When there is a change to such user data, the subscription engine may initiate the corresponding query request. For each query request that the subscription engine is monitoring, the subscription engine monitors the user data associated with the query request. In one or more embodiments of the invention, monitoring the user data may include receiving a notification from the DBMS (108) each time any user data has changed. In such scenarios, the subscription engine may process each notification to determine whether the user data that has change is associated with any of the query requests that it is monitoring. If user data is associated with one or more query requests, then the subscription engine either: (i) issues the query request to the query system (e.g., to a query node), receives a query result and then provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node.

In another scenario, the subscription engine (104) may, for each query request it is monitoring, specify to the DBMS (108) which user data sub-regions (i.e., sub-regions with user data) to monitor. In this scenario, the DBMS may only notify the subscription engine of user data changes to the user data sub-regions specified by the subscription engine. When a notification is received by the DBMS (108), the subscription engine may be process each notification to determine associated query request(s). Once the associated query request(s) is identified, then the subscription engine either: (i) issues the query request to the query system (e.g., to a query node), receives a query result, and provides the query result to the appropriate client(s) (or instructs the query system to send the query result directly to the appropriate client), or (ii) notifies the appropriate client(s) (i.e., the client(s) that requested that the subscription engine monitor the query request), where the client(s) subsequently issues the appropriate query request to the query node.

In one embodiment of the invention, the subscription engine may be implemented on a computing device (see e.g., FIG. 5) or as a logical device (e.g., a virtual machine, a container, etc.).

FIG. 1B shows a diagram of a query node in accordance with one or more embodiments of the invention. In one embodiment of the invention, the query node (200) includes a cache (202), a query node engine (210), a node distribution key list (212), and a data flow graph (214). Each of these components is described below.

In one embodiment of the invention, the cache (202) is volatile memory (e.g., random access memory) that stores data associated with one or more sub-regions (204A, 204N). More specifically, data stored in the cache that is associated with a sub-region (i.e., sub-region data (206)) may be user data or derived data. Further, the sub-region data (206) is associated with a revisions map (208). More specifically, each piece of data (user data or derived data) is associated with a sub-region and a revisions map (208) (or a relevant portion thereof, see e.g., FIGS. 4A-C) (as described above in FIG. 1A). Accordingly, for a given piece of data or sub-region, there may be multiple different versions each associated with their own unique revisions map. Additional detail about sub-regions is provided below in FIG. 1C. The manner in which data is stored in the cache and the manner in which data is removed and/or added to the cache may vary based on the implementation of the invention. Further, the mechanism used to manage a cache on a given query node may be the same or different than the mechanism used to manage the cache on a different query node. Moreover, the caching used in the query system does not require the caches on the query nodes to be consistent and/or coherent.

Figure 3A:
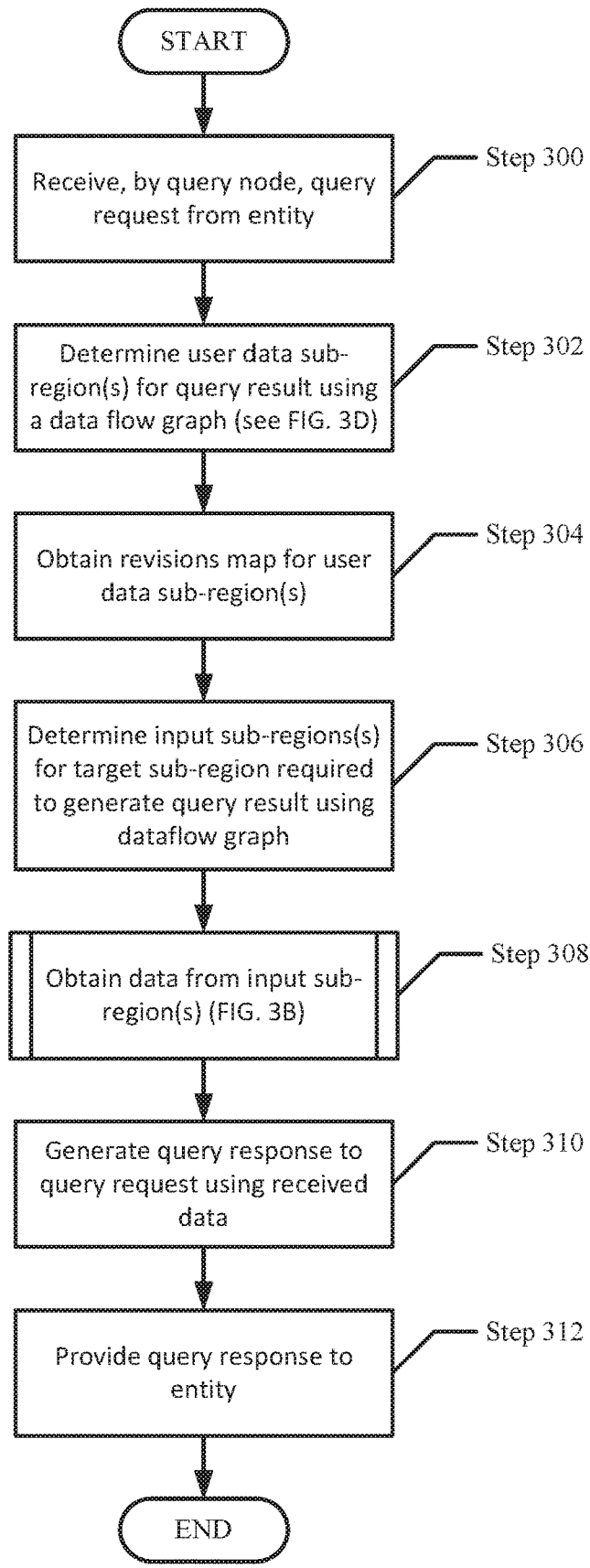
FIGS. 3A-3D show flowcharts for servicing a query request from a client in accordance with one or more embodiments of the invention.
Figure 3B:
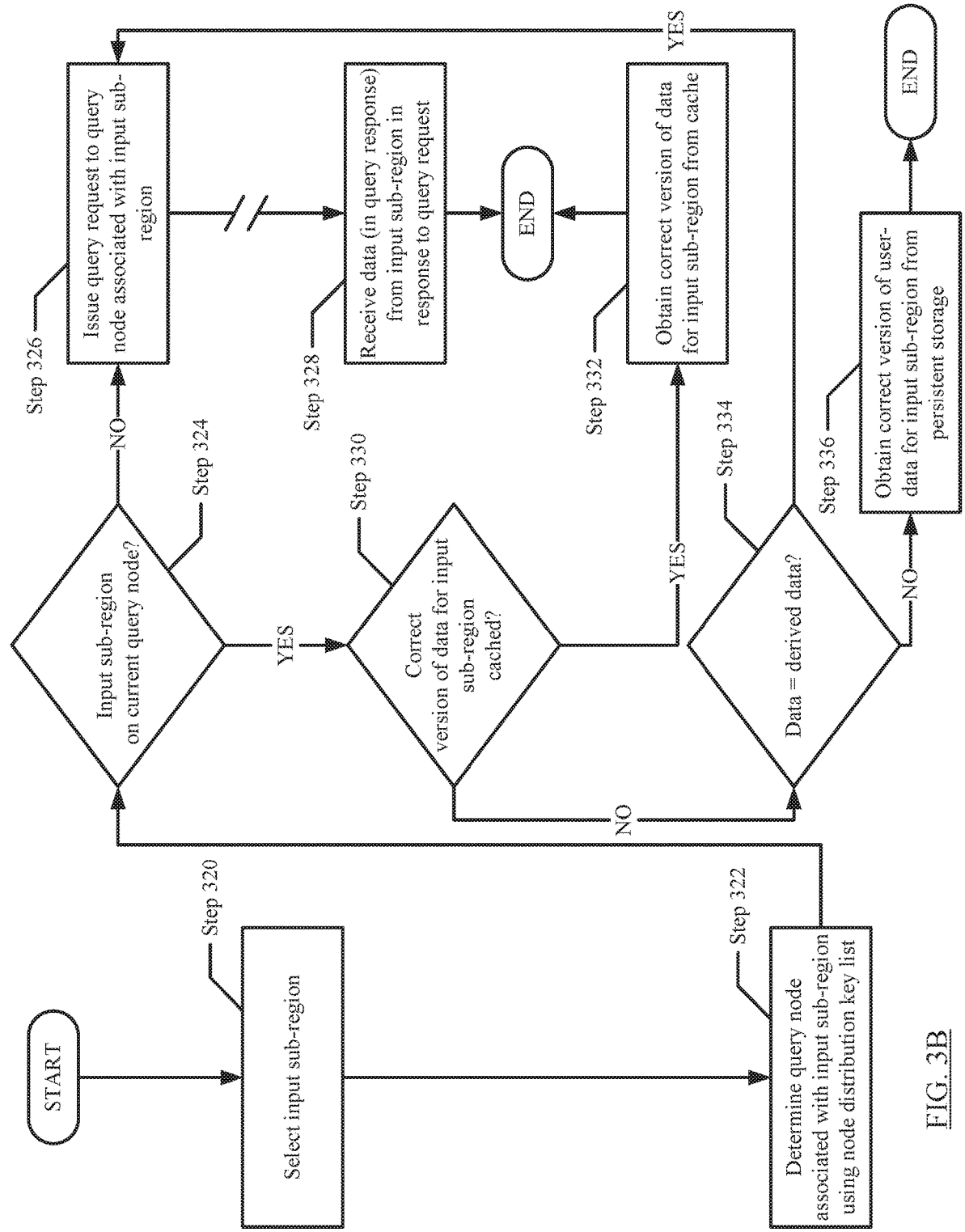
Figure 3C:
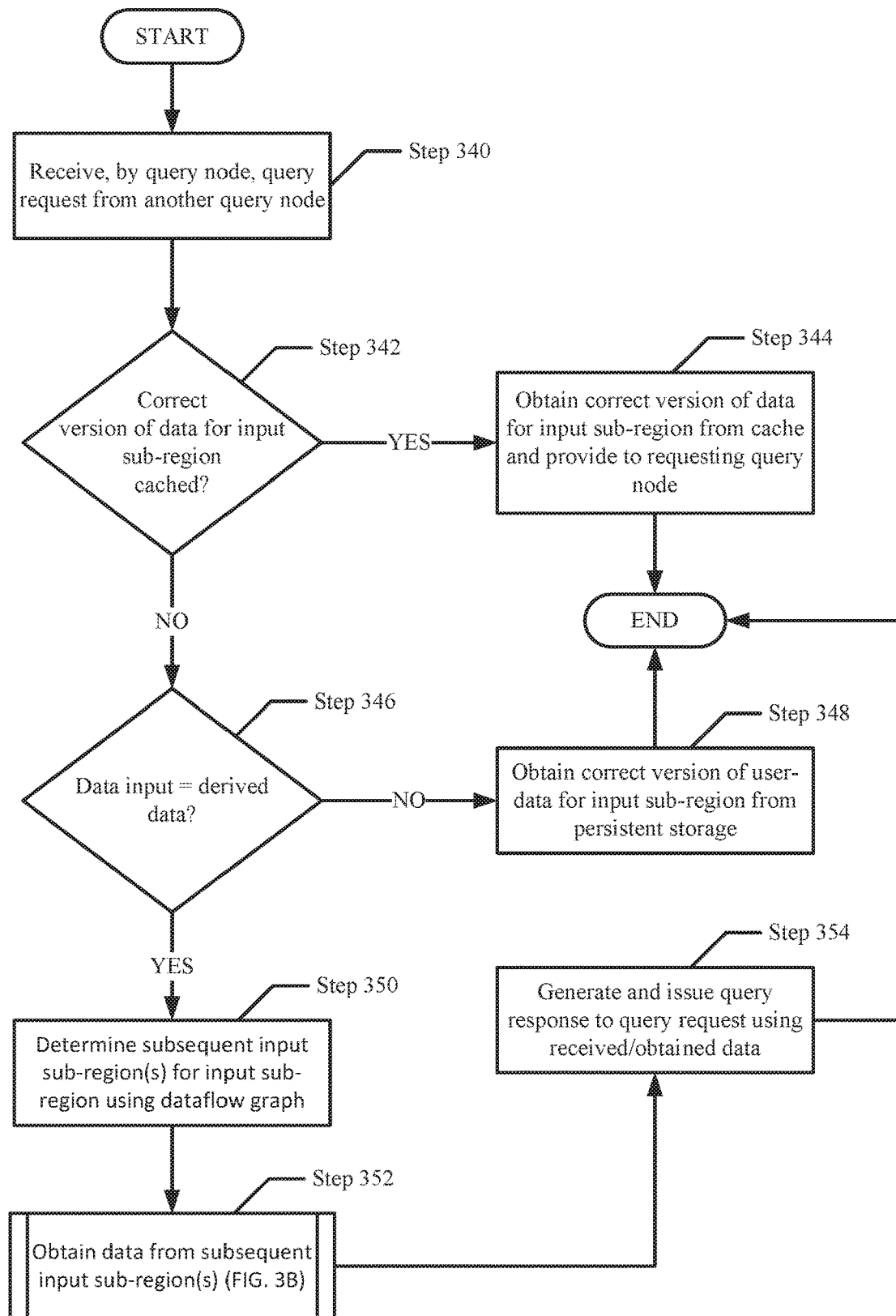
Figure 3D:
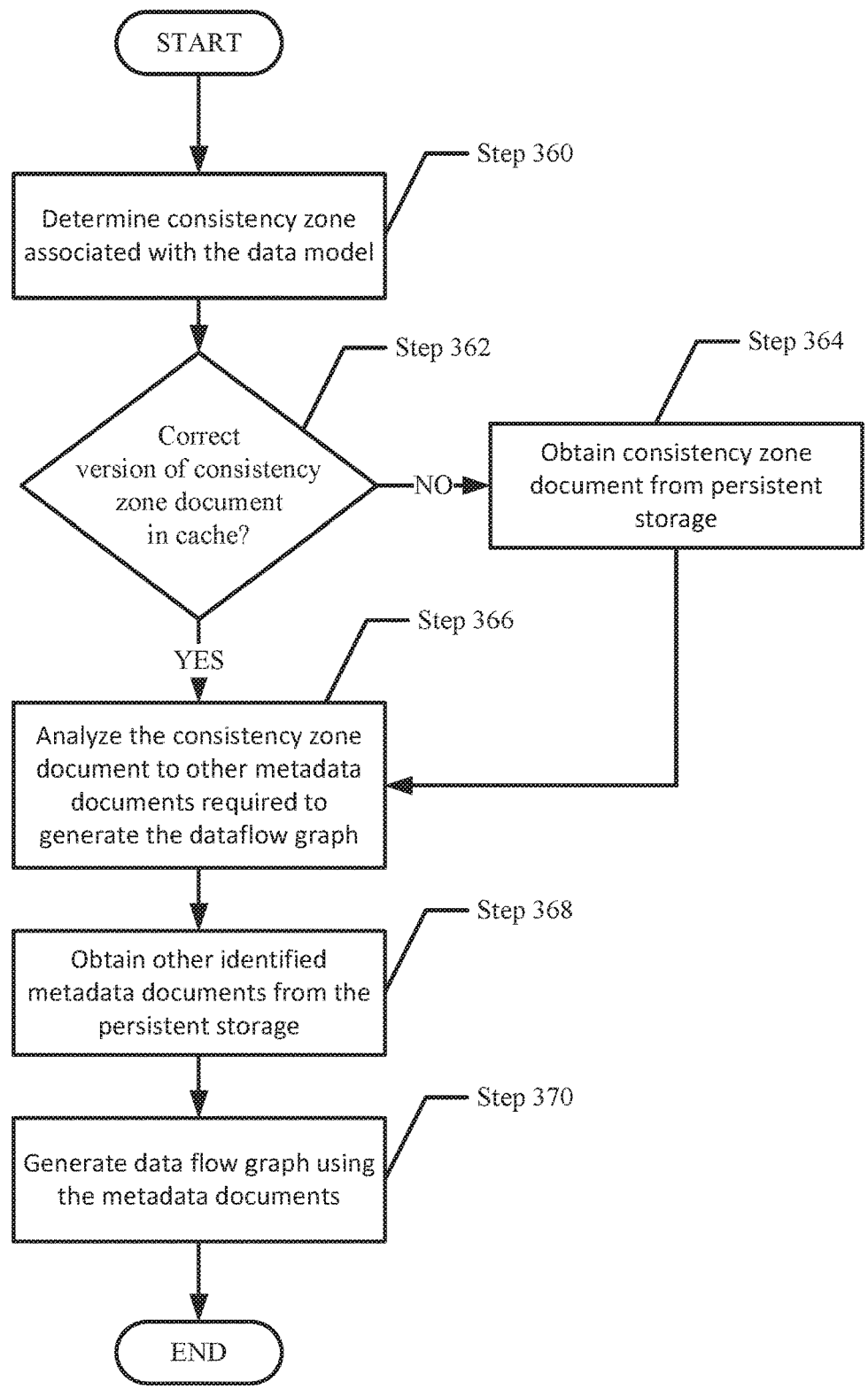

In one embodiment of the invention, the query node engine (210) is configured to perform all or a portion of the functionality described in FIGS. 2-3D.

In one embodiment of the invention, the node distribution key list (212) specifies a list of node distribution keys associated with each query node in the query system. The generation, operation, and use of the distribution key and the node distribution key list are described below with respect to FIGS. 2-3D.

In one embodiment of the invention, the data flow graph (214) specifies the relationships between the regions and/or sub-regions (where the specific granularity of the data flow graph may vary based on the implementation of the invention). More specifically, in one embodiment of the invention, the data is stored in the query system based on a data model. The data model may specify, among other information, what data is stored and the relationships between the stored data. Additional details about the data flow graph and the data model is described in FIG. 1C.

FIG. 1C shows relationships between various elements in the system in accordance with one or more embodiments of the invention.

As discussed above, the data is stored in the query system in accordance with a data model (300). In one embodiment of the invention, data is stored in cells, where each cell is associated one or more dimensions (302). The dimensions are specified by the data model (300) and define what specific data is stored within a given cell. Each of the cells is associated with a region (304), where the data model may specify multiple regions (304). Said another way, the data stored in accordance with the data model may be grouped into regions (304), where each region includes multiple cells. In one embodiment of the invention, if the region (304) only includes user data, then it may be referred to as dataspace. Continuing with the discussion of FIG. 1C, the relationship between the regions (or sub-regions) is specified using a data flow graph (306). The data flow graph may specify whether a given cell includes user data or derived data. If a given cell includes derived data, the data flow graph may specify: (i) what user data and/or derived data are inputs to the particular cell (i.e., are input to generating the derived data of the cell) and (ii) the function (which may be mathematical function or algorithm) is used to combine the aforementioned inputs. An example of a data flow graph in shown in FIG. 4B.

Each region (304) may be divided into two or more sub-regions (308). Each sub-region for a given region may have the same outer dimension(s) but different inner dimensions. For example, consider a scenario in which a given region is associated with a time dimension (specified as months of the year) and a geographic location dimension, which specifies North America, South America, Europe, Asia, Africa, and Australia. In this example, the outer dimension is time and the inner dimension is geographic location. Accordingly, if the region was to be divided into sub-regions, then each sub-region would be associated with a same time dimension but a different geographic location (e.g., North America, South America, Europe, Asia, Africa, or Australia).

Continuing with the discussion of FIG. 1C, each sub-region (308) is associated with one or more outer dimensions (302), one or more inner dimensions (304), a distribution key (312), and one or more sets of data (referred to as sub-region data) (314A, 314N), where the data is associated with corresponding revisions map (316A, 316N) (as described above). Additional detail about the designation of a dimension as an inner or outer dimension is provided in FIGS. 2A-B. In one embodiment of the invention, the distribution key (312) is generated by applying a function to at least one outer dimension associated with the sub-region. The function may be, for example, a consistent hashing function. The use of the distribution key is described below in FIGS. 2A-3D.

Figure 1D:
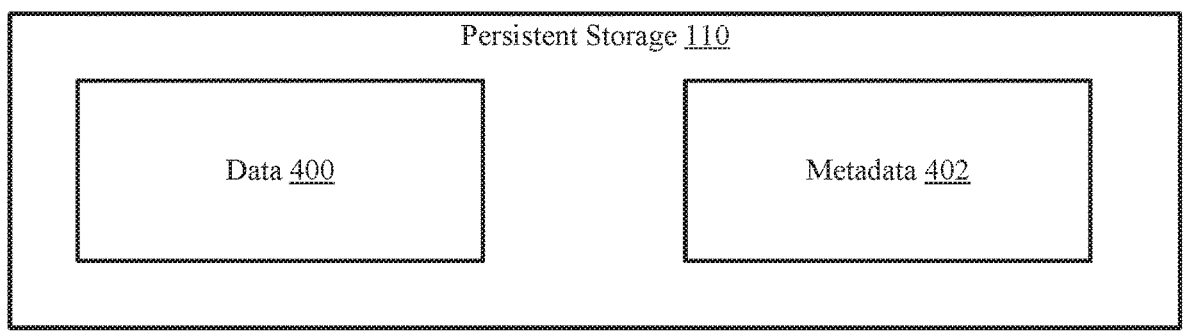
FIG. 1D shows the contents of the persistent storage in accordance with one or more embodiments of the invention.

FIG. 1D shows the contents of the persistent storage (110) in accordance with one or more embodiments of the invention. The persistent storage may include data (400) and metadata (402). The data (400) may include any user data (defined above) and/or derived data (defined above). The metadata (402) may be, but is not limited to, any data that is used to define characteristics of the data model(s) with which the data is associated. For example, the metadata may define which dataspaces are associated with the data model as well as which dimensions are associated with each of the dataspaces. The metadata (402) may include other information without departing from the invention.

Figure 1E:
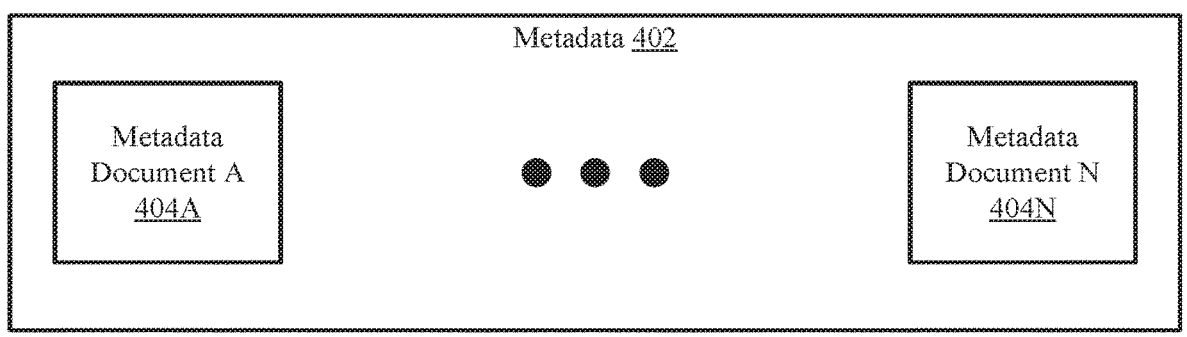
FIG. 1E shows metadata in accordance with one or more embodiments of the invention.

FIG. 1E shows metadata in accordance with one or more embodiments of the invention. The metadata (402) may be stored in the persistent storage as a series of documents (metadata document A (404A), metadata document N (404N)). Each metadata document may correspond to a metadata element that is used by the query system. A metadata element corresponds to an element that defines (at least in part) how at least a portion of the data is logically organized. Each metadata element may include a name and a unique identifier. Further, the metadata element may be self-describing within the consistency zone with which the metadata document is associated. Continuing with example from FIG. 1D, the metadata elements may be the individual dataspaces and the individual dimensions used in the aforementioned dataspaces. The metadata elements are not limited to the aforementioned examples.

Figure 1F:
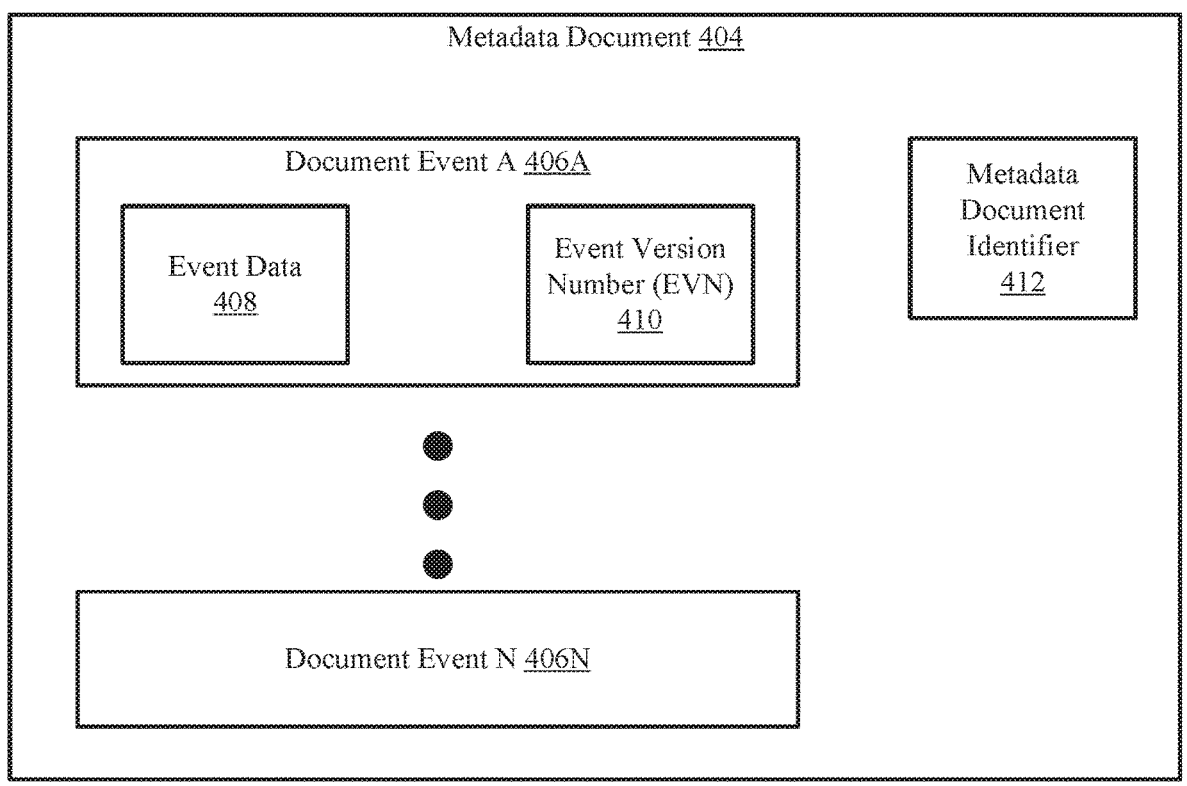
FIG. 1F shows a metadata document in accordance with one or more embodiments of the invention.

FIG. 1F shows a metadata document in accordance with one or more embodiments of the invention. Each metadata document (404) includes a metadata document identifier (412) that uniquely identifies the metadata document within a consistency zone (See FIG. 1G). The metadata document identifier may be implemented as uniform resource identifier (URI). However, other identification schemes may be used without departing from the invention.

Each metadata document (404) further includes all document events (406A, 406N) that have been performed on the metadata element with which the metadata document (404) is associated. Each document event (406A, 406N) modifies or otherwise changes the metadata associated with the metadata element. The modifications may include, but are not limited to, creating the metadata document, adding metadata to the metadata document, modifying pre-existing metadata that is in metadata document, and removing metadata that is in the metadata document. Each document event (406A, 406N) includes event data (408) and an event version number (EVN) (410). The event data (408) may specify what modification occurred and the specific metadata that was modified (i.e., added, changed, or deleted). In various embodiments of the invention, the event data may also include a reference to other metadata documents (i.e., other metadata documents in the consistency zone), the reference may include a URI (or metadata document identifier). The reference may also specify a particular version of the metadata document. The specific version of the metadata document may be specified using an EVN. For example, if a metadata document is referencing version 17 of the metadata document for Dimension D, then the reference may be as follows "/documents/dimensions/D@17". In this context, version 17 of the metadata document corresponds to the state of the metadata document after document events from the first document event to document event 17 (i.e., EVN=17) have been performed. In another embodiment of the invention, the metadata document may include a reference to another metadata document without referencing an EVN. In this scenario, the version of the metadata document that is referenced may correspond to the version of the metadata document specified in the associated consistency zone document (See e.g., FIG. 1I).

Continuing with the discussion of FIG. 1F, the EVN (410) uniquely identifies when the specific document event occurred relative to all other document events that are part of the metadata document (404). Said another way, the EVN (410) may be used to obtain an ordering of document events (406A, 406N) in the metadata document (404). Accordingly, when a query node wants to determine the state of the metadata for particular metadata element, the query node may obtain all document events up to a particular EVN and then process the retrieved document events in the EVN order to obtain the state of the metadata for the metadata element at the required EVN.

Figure 1G:
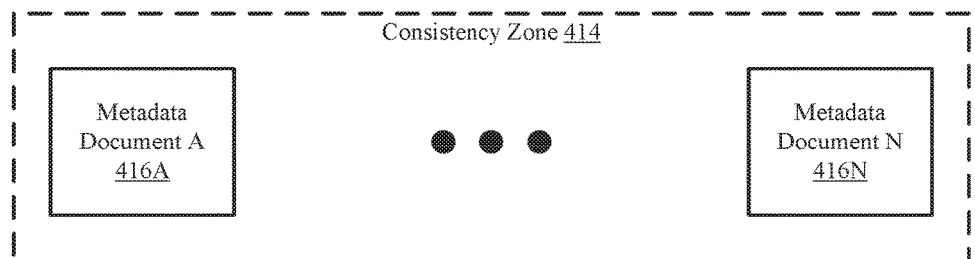
FIG. 1G shows a consistency zone in accordance with one or more embodiments of the invention.

FIG. 1G shows a consistency zone in accordance with one or more embodiments of the invention. In one embodiment of the invention, the persistent storage includes multiple consistency zones (414) and each metadata document is associated with at most one consistency zone. The metadata documents (416A, 416N) associated with a consistency zone (414) are permitted to be modified concurrently. Said another way, multiple metadata documents (416A, 416N) in a consistency zone may be modified concurrently as part of a single atomic transaction (see FIG. 1J). However, metadata documents that are associated with different consistency zones may not be part of a single atomic transaction.

As discussed above with respect to FIG. 1F, each document event is associated with an EVN. The EVN, while providing a strict ordering of document events for the metadata document (e.g., FIG. 1F, 404), also provides a strict ordering of all document events for all metadata documents associated with a consistency zone. Said another way, each document event that is stored in any metadata document that is part of a consistency zone will have an EVN that is specified at the consistency zone level as opposed to the metadata document level. In this manner, no two document events in consistency zone will have the same EVN. Further, while multiple metadata documents may be concurrently modified within a consistency zone as part of an atomic transaction, each of the document events associated with the transaction will have their own EVN.

Figure 1H:
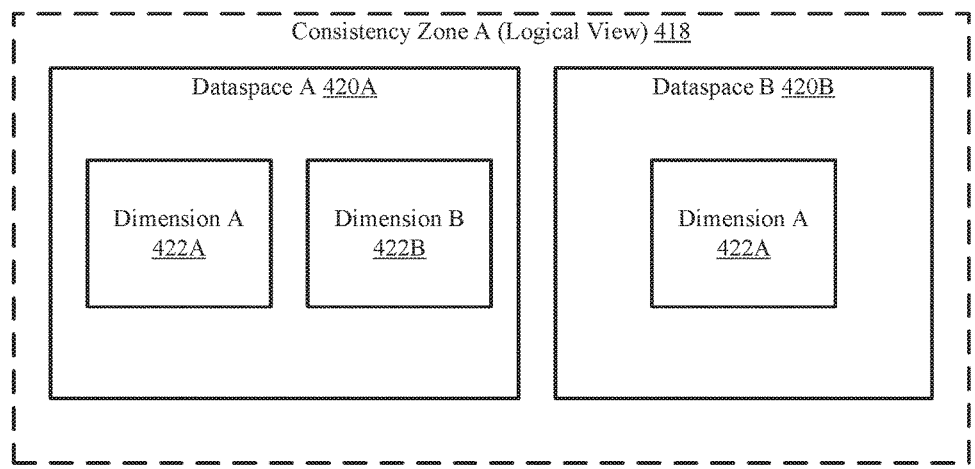
FIG. 1H shows a logical view of a consistency zone in accordance with one or more embodiments of the invention.

In one embodiment of the invention, the metadata elements within a consistency zone may include a logical hierarchy. A non-limiting example of a logical hierarchy is provided in FIG. 1H. Referring to FIG. 1H, FIG. 1H shows a logical view of a consistency zone in accordance with one or more embodiments of the invention. In this example, consistency zone A (418) logically includes two dataspaces, namely, dataspace A (420A) and dataspace B (420B). Dataspace A (420A), in turn, logically includes dimensions A (422A) and B (422B) while dataspace B (420B) also includes dimension A (422A). As discussed above, each of the metadata elements is associated with its own metadata document. Accordingly, while the aforementioned metadata elements are organized, or related in a logical hierarchy, they are each associated with their own metadata document in the persistent storage.

Figure 1I:
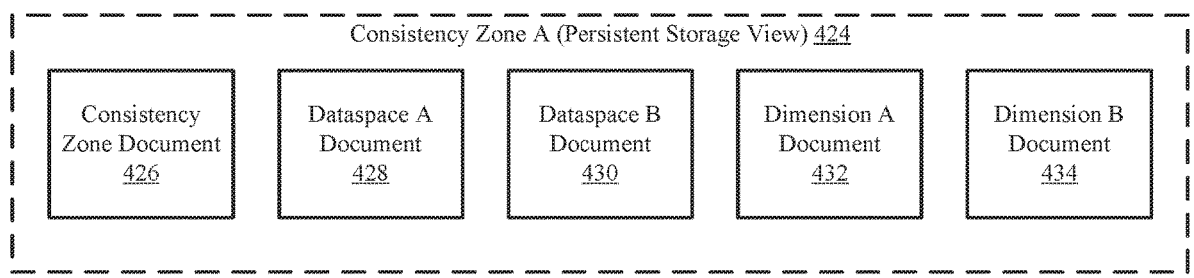
FIG. 1I shows a persistent storage view of the consistency zone in FIG. 1H in accordance with one or more embodiments of the invention.

Specifically, referring to FIG. 1I, FIG. 1I shows a persistent storage view of the consistency zone in FIG. 1H in accordance with one or more embodiments of the invention. In this example, each of the aforementioned metadata elements (i.e., dataspace A (420A), dataspace B (420B), dimension A (422A), dimension B (422B)) as well as the consistency zone itself (i.e., consistency zone A (418)) is associated with its own metadata document. Accordingly, consistency zone A (424) in this example includes the following metadata documents: consistency zone A document (426), dataspace A document (428), dataspace B document (430), dimension A document (432), and dimension B document (434). In one embodiment of the invention, consistency zone A document (426) includes a reference to all other metadata documents within consistency zone A. In this manner, a query node made retrieve a single metadata document for the consistency zone (i.e., the consistency zone document) and, by processing this single metadata document, determine all other metadata documents within the consistency zone. If the query node subsequently retrieves (e.g., in parallel) all of the other metadata documents (based on the URIs specified in the consistency zone document for each of the metadata documents), the query node may be able to efficiently retrieve all metadata associated with the consistency zone and, by extension, all metadata associated with a data model associated with the consistency zone.

Figure 1J:
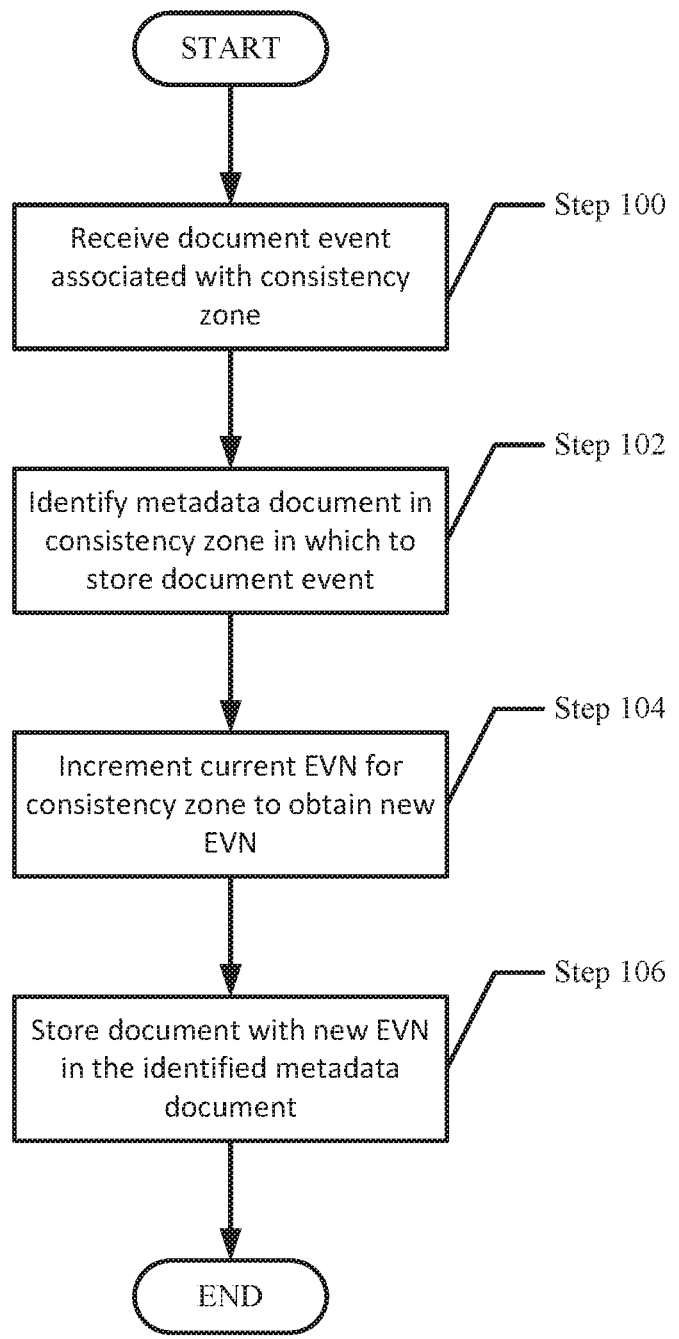
FIG. 1J shows a flowchart for modifying a metadata document in a consistency zone.

FIG. 1J shows a flowchart for modifying a metadata document in a consistency zone. The method shown in FIG. 1J may be performed by the DBMS or another component in the query system. In step 100, a document event associated with the consistency zone is received. The document event may be received from and/or generated as a result of, for example, a client that is interacting with the query system.

In step 102, the metadata document in the consistency zone that is associated with the document event is identified. This identification may be performed by analyzing event data in the document event. Other mechanisms may be used without departing from the invention.

As discussed above, each document event in the consistency zone is strictly ordered. Accordingly, in step 104, the current EVN for the consistency zone is determined and then incremented to obtain a new EVN. The current EVN for the consistency zone corresponds to the last EVN that was stored with a document event in any metadata document within the consistency zone. In step 106, the document event along with the new EVN is stored in the metadata document identified in step 102.

Figure 1K:
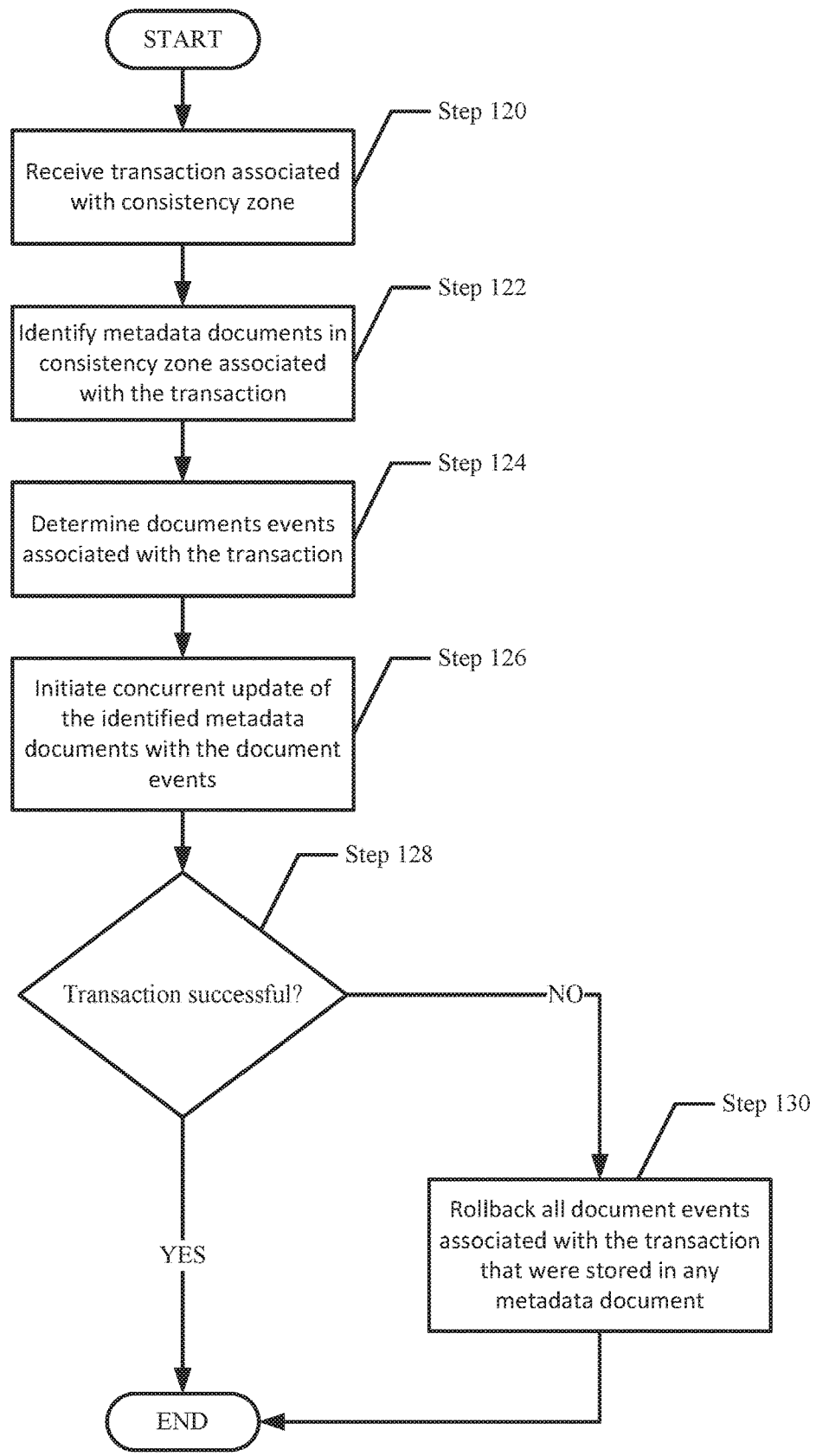
FIG. 1K shows a flowchart for performing a transaction across multiple metadata documents in a consistency zone.

FIG. 1K shows a flowchart for performing a transaction across multiple metadata documents in a consistency zone. The method shown in FIG. 1K may be performed by the DBMS or another component in the query system.

In step 120, a transaction associated with the consistency zone is received. The transaction may be an atomic transaction that requires adding a document event to at least metadata documents within the consistency zone.

In step 122, the metadata documents associated with the transaction are identified. The identified metadata documents are the metadata documents to which one or more documents events will be stored as part of the transaction.

In step 124, the document events associated with the transaction are determined (or identified).

In step 126, concurrent updating of the metadata documents (identified in step 122) with the document events (identified in step 124) is initiated. In another embodiment of the invention, metadata documents may be updated serially.

In step 128, a determination is made about whether the transaction is successful. The transaction is successful if all document events identified in step 124 were stored in the appropriate metadata documents identified in step 122, where each of the document events is associated with a unique EVN (see FIG. 1F). The transaction may fail if: (i) at least one document event is not permitted to be stored in the appropriate metadata document or (ii) if at least one document event is not stored in the appropriate metadata document. If the transaction is successful, the process ends; otherwise, the method proceeds to step 130.

In step 130, if any document events that were part of the failed transaction were stored in any metadata document, then such document events are deleted (or otherwise removed) from the metadata documents in which they were stored.

While the system of FIGS. 1A-1J has been illustrated as including a limited number of components for the sake of brevity, the system may include additional components (not shown), fewer components, and/or different components (not shown) without departing from the invention.

FIGS. 2A-3D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-3D may be performed in parallel with any other steps shown in FIGS. 2A-3D without departing from the scope of the invention.

FIG. 2A shows a flowchart of a method of configuring the system in accordance with one or more embodiments of the invention. All or a portion of the method shown in FIG. 2A may be performed by one or more of the query nodes and/or another computing device or logical device that is external to the query system.

Turning to FIG. 2A, prior to step 200, a data model has been obtained and/or specified. Details about the data model are provided above with respect to FIG. 1C.

In Step 200, the dimensions of the data model are obtained. As discussed above, each region is associated with one or more dimensions. Each dimension may specify an item, measure, or characteristic of data that can be obtained, calculated or manipulated. Examples of dimensions may include, but are not limited to, geographic location, time, organization, users, versions, etc. The dimensions may correspond to default dimensions specified by the query system (or by another system or entity) and/or dimensions that are created by users. Step 200 may including performing the method shown in FIG. 2B.

In Step 202, the dimensions for the data model are analyzed in order to categorize the dimensions as outer dimensions and inner dimensions. The analysis may include using the data flow graph and the data model to determine the dimensions associated with region and how data from one region impacts data in another region(s). While the query requests may be processed using a combination of query nodes (see e.g., FIGS. 3A-3C), the query results may be obtained in a more efficient manner if there is less inter-query node communication (i.e., there are fewer query requests issued between the query nodes). Based on the analysis of the data model and the data flow diagram, the dimensions may be categorized in a manner that minimizes or attempts to minimize the inter-query node communication.

Specifically, in one embodiment of the invention, the distribution of sub-regions across the query nodes is based on the outer dimension(s) of the sub-regions. In such implementations, all sub-regions that are associated with the same outer dimension(s) are located on the same query node. Accordingly, based on the data model and the data flow graph, the outer dimension may be specified such that directly related sub-regions (e.g., sub-regions that are connected by an edge in the data flow graph, see e.g., FIG. 4B, sub-region A and sub-region B) are located on the same query node.

Other heuristics and/or analysis may be performed to categorize the dimensions as inner dimensions and outer dimensions without departing from the invention.

Continuing with the discussion of FIG. 2A, in Step 204, the data model is divided into sub-regions, where each sub-region is associated with at least one outer dimension and at least one inner dimension. For each sub-region, the value of outer dimension(s) is constant while the inner dimension(s) may vary. For example, if the data model includes the following dimensions: geographic location and time. Based on the analysis in step 202, time may be specified as an inner dimension and geographic location may be specified as an outer dimension. In this example, each sub-region may be associated with a specific value for the outer dimension e.g., North America, South America, Africa, Asia, Europe, or Australia, but be associated with varying values for a time dimension. Accordingly, if sub-region A is associated with an outer dimension of Africa, then all data in this sub-region is associated with the geographic location of Africa but with different time periods (e.g., January, February, March, etc.). Those skilled in the art will appreciate that the invention is not limited to the aforementioned example.

Continuing with the discussion of FIG. 2A, in Step 206, a distribution key is generated for each sub-region (i.e., the sub-regions resulting from Step 204). Each distribution key may be generated using a function, such as, a consistent hashing function with the outer dimension(s) of the sub-regions being used as an input(s) to the function. By using the outer dimension(s) of the sub-regions as the input(s) to the function, all sub-regions with the same outer dimension (s) will have the same value for their distribution key.

In Step 208, each of the distribution keys is associated with one of the query nodes. The distribution keys may be spread symmetrically or asymmetrically across the query nodes in order to balance the load of process query requests across the query system. Any known method or later discovered method may be used to associate keys to particular query nodes without departing from the invention. The result of the process in step 208 is a global distribution key list. This global distribution key list specifies which distribution keys are associated with which query nodes.

In Step 210, one of the query nodes in the query system is designated as the lead query node. The query node, in various implementations of the invention, may include functionality to: (i) send to all query nodes in the query system (or at least to the query nodes that are specified in the global distribution key list) the global distribution key list; (ii) update the global distribution key list during the operation of the query system to account for changes in the loads experienced by the various query nodes and/or to address issues (e.g., failures or degraded operation) of one or more of the query nodes and (iii) to propagate updates of the global distribution key list to the various non-leader query nodes. For purposes of this disclosure, each query node maintains its own distribution key list (referred to as a node distribution key list), which is intended to be the same as the global distribution key list; however, due to potential latency issues in the propagation of updates to the global distribution key list, the node distribution key list on a given query node may be inconsistent (for at least period of time) with the global distribution key list. By using the node distribution key lists and maintaining redundant copies of the node distribution key list, the query system is not limited to all query nodes attempting to access a single copy of the node distribution key list, thereby making the query system fault tolerant. Specifically, if the lead query node fails or becomes unavailable, the query system will continue to operate by (i) designating a new lead query node and (ii) updating the global distribution key list to move all sub-regions that were previously managed by the failed query node to other active query nodes in the query system.

Continuing with the discussion of FIG. 2A, after configuration of the query system (e.g., using the method shown in FIG. 2A), the query system may service query requests in accordance with FIGS. 3A-3D.

FIG. 2B shows a flowchart of a method for processing metadata documents to determine dimensions in a data model in accordance with one or more embodiments of the invention. All or a portion of the method shown in FIG. 2B may be performed by one or more of the query nodes and/or another computing device or logical device that is external to the query system.

In step 220, the consistency zone associated with the data model (i.e., the data model for which the dimensions are required) is determined.

In step 222, a determination is made about whether a correct version of the consistency zone is present in a cache (i.e., the cache of the entity performing the method). The correct version of the consistency zone may correspond to: (i) the most recent version of the consistency zone or (ii) a version of the consistency zone associated with a particular EVN. The correct version of the consistency zone may be determined based on the specific version of the data model on which the query request will be based (see e.g., FIGS. 3A-3D). If the correct version of the consistency zone is in the cache, the process proceeds to step 226; otherwise, the process proceeds to step 224.

In step 224, if no portion of the consistency zone document (i.e., the metadata document for the consistency zone) is present in the cache, then all events up to the latest EVN or a specific earlier EVN are obtained from the persistent storage. If a portion of the consistency zone document is present in the cache, then only the document events for the consistency zone that are not present in the cache are obtained. For example, if the consistency zone document in the cache has document events up to EVN 17 but the correct version of the consistency zone is EVN 30, then all document events in the consistency zone document with 17<EVN<31 are obtained.

Continuing with the discussion of FIG. 2B, in step 226, the consistency zone document (which includes the appropriate document events) is analyzed to determine the dimensions in the data model. For example, the document events may be analyzed to determine all URIs for all dimension documents. Once the dimensions in the data model are identified, additional metadata for each of the dimensions is obtained.

In another embodiment of the invention, all of the document events in the consistency zone, starting at the document event with the lowest EVN, are processed in order to generate an in-memory data structure on the query node. The in-memory data structure is then analyzed to identify all dimension documents in the consistency zone.

In one embodiment all document events for the document are loaded into memory in order to generate a single in-memory data structure for the document. If a portion of the document events for a metadata document were previously loaded into the memory and, as a result, there is a pre-existing in-memory data structure for the metadata document, then only the new document events for the metadata document (i.e., document events that were not previously loaded into the memory) are loaded into memory and used to update the pre-existing in-memory data structure for the metadata document.

Specifically, in step 228, the metadata document for each of the dimensions is obtained. The metadata documents may be obtained serially or in parallel. The metadata documents for each of the dimensions may be obtained using a mechanism that is the same or similar to method for obtaining the consistency zone document shown in steps 222-224.

FIGS. 3A-3D show flowcharts for recursively servicing a query request from a client in accordance with one or more embodiments of the invention. All or a portion of the method shown in FIGS. 3A-3D may be performed by one or more of the query nodes. Further, different sets of query nodes in the query system may be concurrently servicing different query requests using the method described in FIGS. 3A-3D.

The methods shown in FIGS. 3A and 3D are from the perspective of the query node that received the query request from a client or the subscription engine. The method shown in FIG. 3B is from the perspective of a query node, which may or may not be query node that received the query request. FIG. 3C is from the perspective of other query nodes in the system that assisting in servicing the query request but that did not receive the initial query request from the client or the subscription engine.

Turning to FIG. 3A, in Step 300, a query request is received by the query node. The query request may specify a specific sub-region (referred to as the target sub-region). In this context, the data in the target sub-region corresponds to the data that is being requested via the query request. The query request may, but is not required to, specify a particular version of user data (which may be different per user data) to use to service the query request. If no version of user data is specified (or new version is specified for particular user data), then the query request may use the current version (or the newest version) of such user data to service the query request. The query request may be issued by an entity, where the entity may be client or the subscription engine.

In Step 302, the user data sub-region(s) for the query is determined. More specifically, the data flow graph may be generated in accordance with FIG. 3D and then subsequently analyzed to determine the underlying user data region(s) that are required to ultimately calculate the data in the target sub-region.

In Step 304, the revisions map for the user data sub-regions is obtained. In one embodiment of the invention, the query node may issue a revisions map request, which specifies the user data sub-regions, to the DBMS (see e.g., FIG. 1A, 108). In response to the request, the DBMS obtains and subsequently provides the revisions map to the query node. The revisions map, as discussed above, specifies a version number (or other identifier) for each user data sub-region.

In one embodiment of the invention, the query node may issue a revisions map request, which specifies the user data sub-regions and some other criteria, to the DBMS (see e.g., FIG. 1A, 108). The criteria may specify a time, date, or other criterion that may be used to identify a specific version of one or more user data sub-regions. For example, the revisions map request may specify "January 2018" for user-data sub-region A. In response to the request, the DBMS obtains and subsequently provides the revisions map to the query node, where the revisions map specifies a version number for user data sub-region A that corresponds to January 2018. The above example is not intended to limit the scope of the invention.

In Step 306, the input sub-regions for the target sub-region are determined. The input sub-regions correspond to sub-regions, as specified in the data flow graph, which include data (which may be derived data or user data) that is used as input to the target sub-region.

In Step 308, the data is obtained from each of the identified input sub-regions (see e.g., FIG. 3B). The data may be obtained from the cache in the query node, from persistent storage, or from another query node.

In Step 310, one or more functions (e.g., mathematical functions or algorithms) are applied to the data obtained in step 308 is to generate data for the target sub-region. The resulting data is then used to generate a query response, where the query response may include the data associated with the target sub-region.

In Step 312, the query response is provided to entity that issued the query request or to another entity. For example, the query response may be issued to the client that initiated the query request, to the subscription engine that initiated the query request, or to a client where the query request was issued by the subscription engine for the client.

Referring to FIG. 3B, FIG. 3B shows a method for obtaining data from the input sub-regions identified in Step 306. The method shown in FIG. 3B is performed (concurrently, serially, or some combination thereof) for all of the input sub-regions identified in Step 306 or step 352 (below).

Turning to FIG. 3B, in Step 320, an input sub-region is selected. In Step 322, the query node that is managing the selected input sub-region is determined using the node distribution key list on the query node (which may the global distribution key list if the query node is the leader query node). In one embodiment of the invention, the outer dimension(s) of the input sub-region are used as input to a function (e.g., a consistent hashing function) to determine a distribution key for the input sub-region. The node distribution key list on the query node is then queried with the distribution key to identify the query node that is managing the input sub-region.

In Step 324, a determination is made about whether the query node identified in step 322 is the current query node (i.e., the query node that performed step 322). If the query node identified in step 322 is the current query node, then the process proceeds to step 330; otherwise, the current query node is not managing the input sub-region and, as such, the process proceeds to step 326.

In Step 326, the current query node issues a query request to the query node with is identified in step 322. Once the query request is issued, the current query node waits until it receives a response (in step 328) from the query node to which it issued a query request. The query request issued in step 326 specifies the input sub-region and the revisions map (i.e., the revisions map from step 304) (or a portion thereof).

In Step 328, a response to the query request is received, where the response includes the data associated with the selected input sub-region. If the data for the input sub-region is user data, then the received data corresponds to the user data version specified in the revisions map (e.g., if the revisions map specified version 2 of user data for the input sub-region, then the received data is version 2 of the user data) (or a portion thereof). If the data for the input sub-region is derived data, then the received data corresponds to the derived data that is directly or indirectly generated using the user data version specified in the revisions map (e.g., if the revisions map specified version 2 of user data for the input sub-region, then the received data is directly or indirectly derived from version 2 of the user data) (or a portion thereof). The data obtained via the query response may be stored in the cache of the query node along with the corresponding revisions map (or portion thereof). The process then ends.

Referring back from Step 324, if the query node identified in step 322 is the current query node, then in Step 330 a determination is made about whether the correct version of the data associated with the input sub-region is present in the cache. As discussed above, the cache may store multiple versions of data (which may be user data or derived data) for a given sub-region, where each version is associated with a revisions map. Accordingly, the determination in step 330 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 332; otherwise, the process proceeds to step 334.

In Step 332, the correct version of the data associated with the input sub-region is obtained from the cache. The process then ends.

Referred back to Step 330, if the correct version of the data associated with the input sub-region is not present in the cache, then in Step 334 a determination is made about whether the data for the selected input region is user data or derived data. If the data for the selected input region is user data, then the process proceeds to step 336; otherwise, the process proceeds to step 326.

In Step 336, the correct version of the data associated with the input sub-region is obtained from the persistent storage. The data obtained from the persistent storage may be stored in the cache of the query node along with the corresponding revisions map (or portion thereof). The process then ends.

Referring to FIG. 3C, FIG. 3C shows a method for servicing inter-query node query requests (i.e., query requests issued in Step 326).

Turning to Step 340, in step 340, a query request is received by a query node from another query node.

In Step 342, a determination is made about whether the correct version of the data associated with the input sub-region is present in the cache. As discussed above, the cache may store multiple versions of data for given sub-region, where each version is associated with a revisions map. Accordingly, the determination in step 342 is whether: (i) there are any versions of the data associated with the input sub-region in the cache and (ii) if so, is any version of these versions of data associated with a revisions map that matches the revisions map determined in step 304. If so, then the correct version of the data associated with the input sub-region is present in the cache and the process proceeds to step 344; otherwise, the process proceeds to step 346.

In Step 344, the correct version of the data associated with the input sub-region is obtained from the cache and then sent back, via a query response, to the query node that issued the query request received in step 340. The process then ends.

Referred back to Step 342, if the correct version of the data associated with the input sub-region is not present in the cache, then in Step 346 a determination is made about whether the data for the selected input region is user data or derived data. If the data for the selected input region is user data, then the process proceeds to step 348; otherwise, the process proceeds to step 350.

In Step 348, the correct version of the data associated with the input sub-region is obtained from the persistent storage and then sent back, via a query response, to the query node that issued the query request received in step 340. The data obtained from the persistent storage may be stored in the cache of the query node along with the corresponding revisions map (or portion thereof). The process then ends.

If the data is derived data, then in Step 350, a subsequent input sub-region(s) is determined for the input sub-region specified in the query request obtained in step 340. The subsequent input sub-region corresponds to the sub-region (s), as specified in the data flow graph, which includes data (which may be derived data or user data) that is used an input into the input sub-region. The process then proceeds to step 352.

In Step 352, the data is obtained from each of the identified subsequent input sub-regions (see e.g., FIG. 3B). The data may be obtained from the cache in the query node, from persistent storage, or from another query node. The process then proceeds to step 354.

In Step 354, a query response is generated using the data obtained in steps 352. The query response is then issued to the query node that issue the query request received in step 340.

FIG. 3D shows a flowchart of a method for processing for generating a dataflow graph in accordance with one or more embodiments of the invention.

In step 360, the consistency zone associated with the data model is determined (i.e., the data model for which the data flow graph is being generated).

In step 362, a determination is made about whether a correct version of the consistency zone is present in a cache (i.e., the cache of the query node performing the method). The correct version of the consistency zone may correspond to: (i) the most recent version of the consistency zone or (ii) a version of the consistency zone associated with a particular EVN. The correct version of the consistency zone may be determined based on the specific version of the data model on which the query request will be based (see e.g., FIGS. 3A-3D). If the correct version of the consistency zone is in the cache, the process proceeds to step 366; otherwise, the process proceeds to step 364.

In step 364, if no portion of the consistency zone document (i.e., the metadata document for the consistency zone) is present in the cache, then all documents events for the consistency zone document up to the latest EVN or a specific earlier EVN are obtained from the persistent storage. If a portion of the consistency zone document is present in the cache, then only the document events for the consistency zone that are not present in the cache are obtained. For example, if the consistency zone document in the cache has document events up to EVN 17 but the correct version of the consistency zone is EVN 30, then all document events in the consistency zone document with 17<EVN<31 are obtained.

Continuing with the discussion of FIG. 3D, in step 366, the consistency zone document (which includes the appropriate document events) is analyzed to determine the dimensions in the data model. For example, the document events may be analyzed to determine all URIs for all other metadata documents in the consistency zone. In another embodiment of the invention, all of the document events in the consistency zone, starting at the document event with the lowest EVN, are processed in order to generate an in-memory data structure on the query node. The in-memory data structure is then analyzed to identify the other metadata documents in the consistency zone.

In step 368, the metadata documents identified in step 366 are obtained. The metadata documents may be obtained serially or in parallel. The metadata documents may be obtained using a mechanism that is the same or similar to method for obtaining the consistency zone document shown in steps 362-364.

In step 370, the metadata documents obtained in step 366 are analyzed in order to generate a data flow graph for the data model. In one embodiment of the invention, all of the metadata documents are loaded into memory and, as such, all of the metadata associated with the data model is present in the cache thereby allowing more efficient processing of the metadata in order to generate the data flow graph. In one embodiment of the invention, all of the document events for each of the metadata documents, starting at the document event with the lowest EVN, are processed in order to generate an in-memory data structure on the query node. These in-memory data structures for the metadata documents may then be analyzed to generate the data flow graph.

EXAMPLE

Figure 4A:
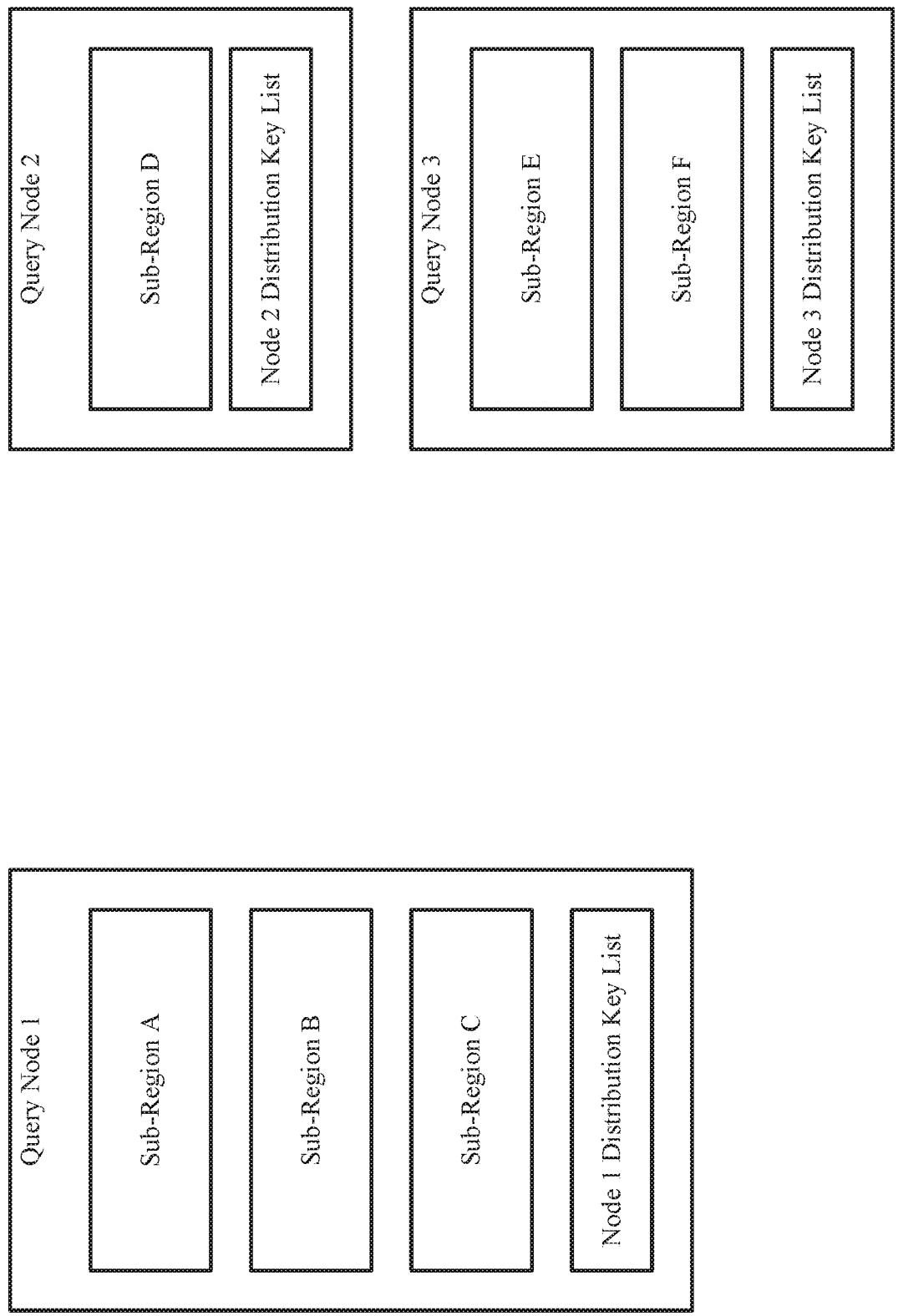
FIGS. 4A-4C shows an example in accordance with one or more embodiments of the invention.
Figure 4B:
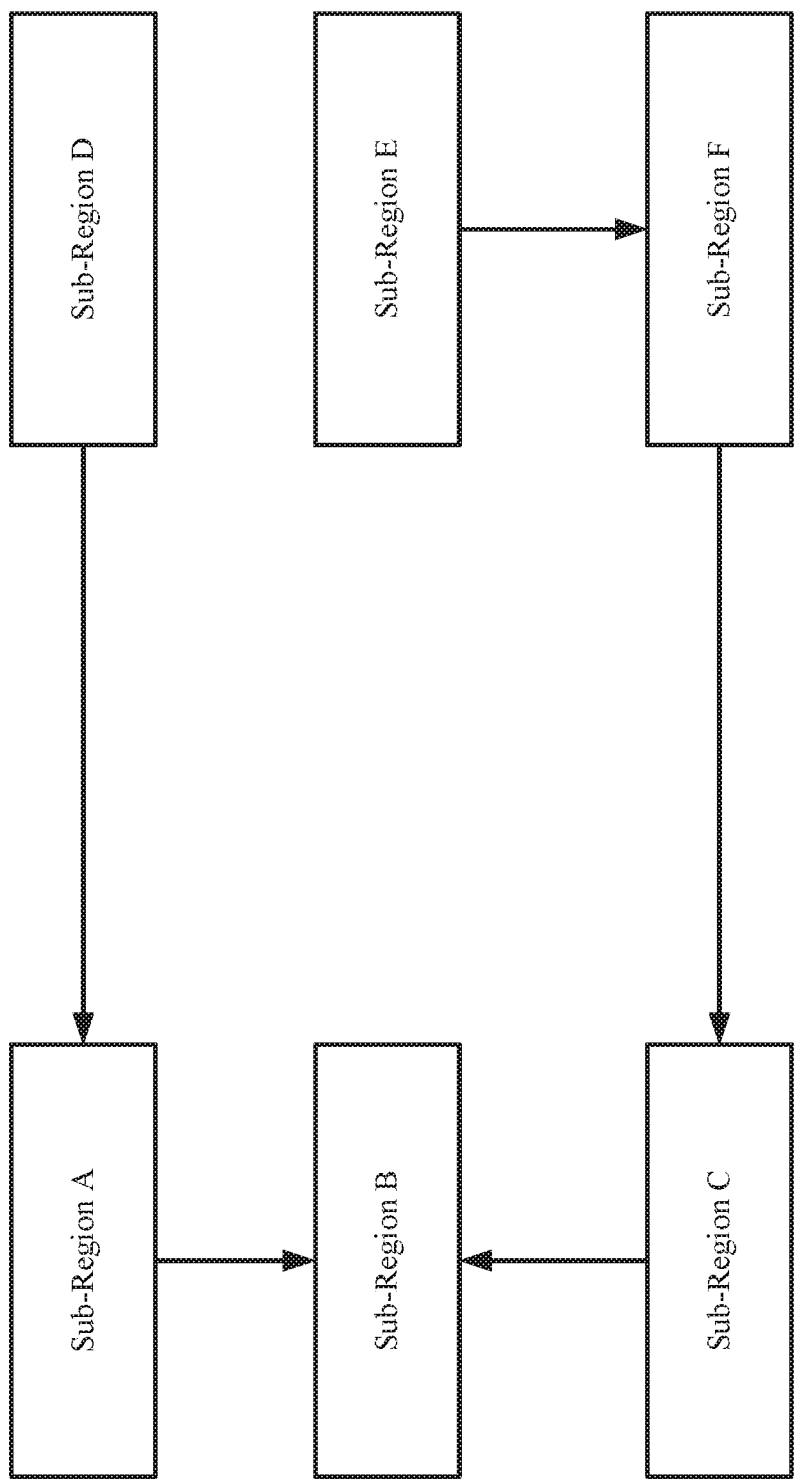
Figure 4C:
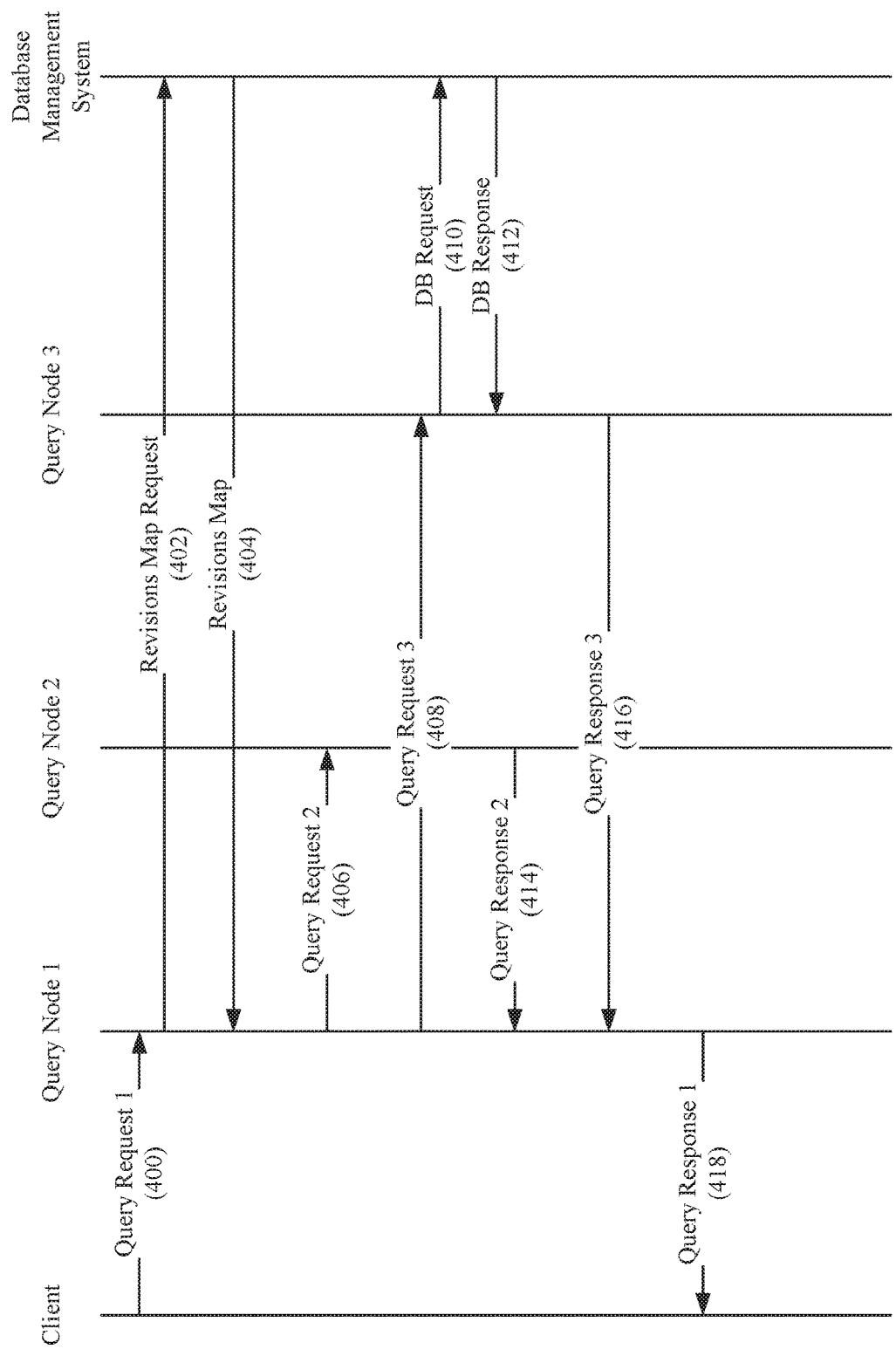

FIGS. 4A-4C shows an example in accordance with one or more embodiments of the invention. The following example is used to illustrate the servicing of a query request in accordance with FIGS. 3A-3C but is not intended to limit the scope of the invention.

Referring to FIG. 4A, consider a scenario in which the query system includes three query nodes, namely, query node 1, query node 2, and query node 3. Further, the data model is divided, in accordance with the method shown in FIG. 2A, into six sub-regions, namely, sub-region A (SRA), sub-region B (SRB), sub-region C (SRC), sub-region D (SRD), sub-region E (SRE), and sub-region F (SRF). In this example, the sub-regions are distributed across the query nodes as follows: query node 1 manages SRA, SRB, and SRC; query node 2 manages SRD, and query node 3 manages SRE, and SRF. Each of the query nodes includes its own node distribution key list, which specifies which query node manages each of the aforementioned sub-regions.

Referring to FIG. 4B, FIG. 4B shows a data flow graph depicting the relationship between the aforementioned sub-regions. Specifically, in this example, SRA, SRB, SRC, and SRF are sub-regions that include derived data while sub-regions SRD and SRE include user data. Further, the input sub-region for SRF is SRE, the input sub-region for SRA is SRD, the input sub-region for SRC is SRF, and the input sub-regions for SRB are SRA and SRC.

Referring to FIG. 4C, consider a scenario in which a client issues query request 1 (400) to query node 1. Query request 1 specifies a target sub-region as SRB but does not specify any specific version of user data to use for servicing the query request. Accordingly, recent version (which may be the most current version) of user data is used as, in this example, the default version of user data is used when no specific version of the user data is specified.

Query node 1, using the data flow graph (see e.g., FIG. 4B) determines that the user data sub-regions associated with SRB are SRD and SRE. In response to this determination, query node 1 issues a revisions map request (402) to the Database Management System (DBMS) for the current version of user data associated with SRD and SRE. The DBMS provides a revisions map (404) in response to the revisions map request, the revisions map (404) specifies the following [SRDv3, SREv1].

Query node 1 then determines that the input sub-regions for SRB are SRA and SRC. For SRA, the query node determines that SRA is managed by query node 1 using the node 1 distribution key list and a distribution key for SRA. As SRA is managed by query node 1, the cache on query node 1 is searched to determine whether it includes data for SRA that is associated with SRDv3. In this example, the cache does not include this data. Accordingly, query node 1 subsequently determines that the input sub-region for SRA is SRD. In response to this determination, query node 1 calculates a distribution key for SRD using the outer dimension of SRD. The node 1 distribution key list in combination with the distribution key for SRD is used to identify that query node 2 manages SRD. Accordingly, query node 1 issues query request 2 (406) to query node 2 for the data in SRD associated with SRDv3.

For SRC, the query node 2 determines that SRC is managed by query node 1 using the node 1 distribution key list and a distribution key for SRC. As SRC is managed by query node 1, the cache on query node 2 is searched to determine whether it includes data for SRC that is associated with SREv1. In this example, the cache does not include this data. Accordingly, query node 1 subsequently determines that the input sub-region for SRC is SRF. In response this determinations, query node 2 calculates a distribution key for SRF using the outer dimension of SRF. The node 2 distribution key list in combination with the distribution key for SRF is used to identify that query node 3 manages SRF. Accordingly, query node 2 issues query request 3 (408) to query node 3 for the data in SRF associated with SREv1.

Query node 3 subsequently receives query request 3 (408). Query node 3 determines that the cache on query node 3 does not include data for SRF that is associated with SREv1 and that the input sub-region for SRF is SRE. In response to the two aforementioned determinations, query node 3 calculates a distribution key for SRE using the outer dimension of SRE. The node 3 distribution key list in combination with the distribution key for SRE is used to identify that query node 3 manages SRE.

Based on this determination, query node 3 searches the cache on query node 3 to determine whether data for SRE associated with SREv1 is present in the cache. In this example, the data for SRE associated with SREv1 is not present in the cache and, as a result, query node 3 issues a DB request (410) to the DBMS which includes revisions map [SREv1]. A DBMS response (412) with the data for SRE associated with [SREv1] is received from the DBMS. The received data along with the following revisions map [SREv1] is stored in the cache on query node 3.

At some later point in time, query node 2 obtains data for SRD associated with SREv1 from its cache and transmits the data (via query response 2 (414)) to query node 1. Further, query node 3 generates data for SRF using the data for SRE associated with [SREv1] and transmits the generated data (via query response 3 (416)) to query node 1.

Upon receipt of query response 2, query node 1 generates data for SRA using the data for SRD associated with [SRDv3] and upon receipt of query response 3, query node 1 generates data for SRC using the data for SRF associated with [SREv1]. The newly generated data for SRA (with an association to SRDv3 and SRC (with an association to SREv1) is cached in query node 1.

Finally, the generated data for SRA and SRC is used to generate the data for SRB. The resulting data for SRB is then transmitted to the client via query response 1. SRB is also cached and associated with [SRDv3, SREv1].

End of Example

Figure 5:
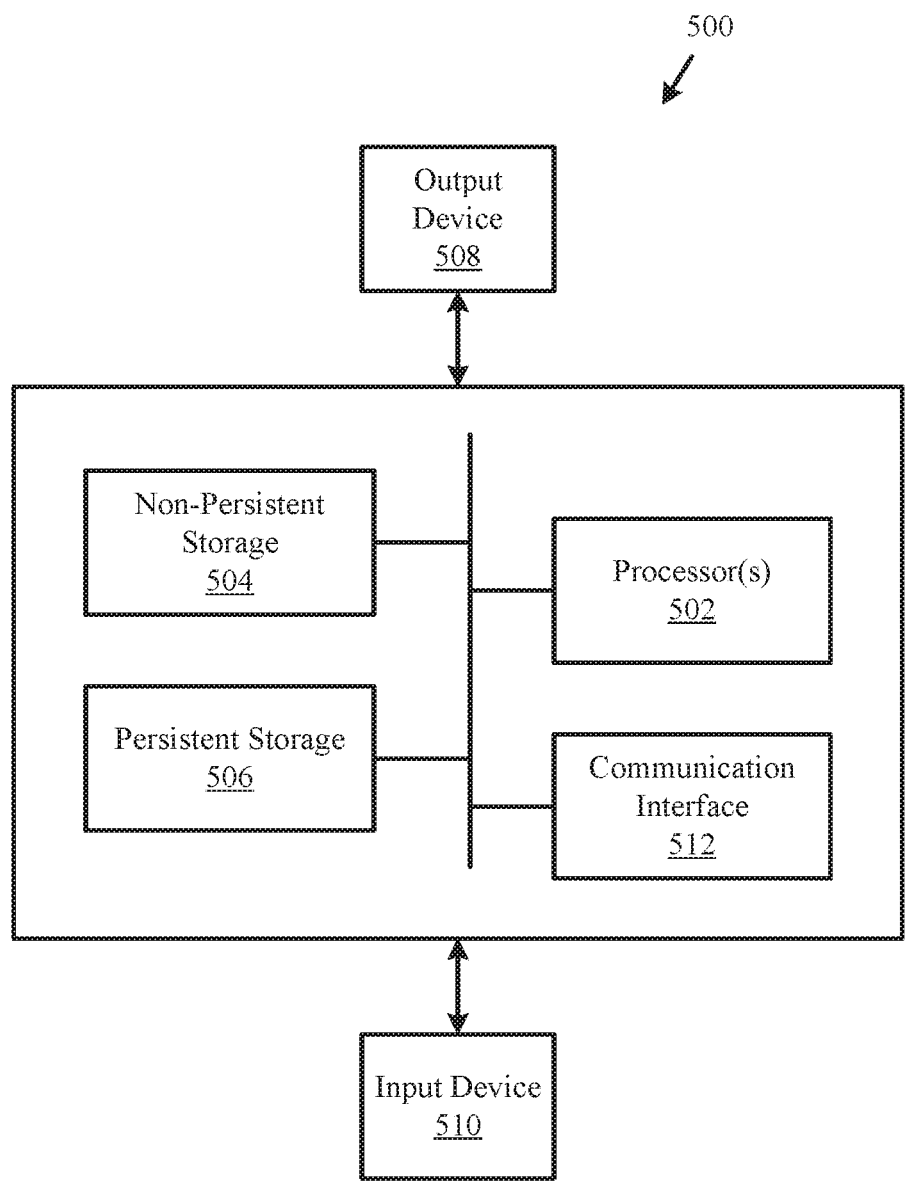
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve data processing technology for very large data sets. Specifically, embodiments of the invention may improve the processing by, example: (i) only requiring user data to be stored in persistent storage as opposed to requiring all derived data to be stored in persistent storage thereby reducing the amount of persistent storage required to implement the query system; (ii) implementing a query system that only requires derived data to be calculated in response to a query request as instead of updating the derived data each time there is an updated to any user data thereby reducing the computing overhead required in query systems in which user data is frequently updated; and (iii) by using strong versioning and a data flow graph that specifies the relationships between sub-regions, a consistent query result may be generated for a given target region using a specific revisions map.

Further, while various metadata documents in the consistency zone may include references to other metadata documents in the consistency zone, this has little or no impact obtaining all metadata for the consistency zone. Specifically, because the consistency zone document includes references to all other metadata documents in the consistency zone, once the consistency zone document is processed, all of the other metadata documents in the consistency zone can be immediately obtained (as they have been identified within the consistency zone document). Once all of the metadata documents have been obtained and loaded into the memory of the query node, to the extent that there is any references between metadata documents that needs to be resolved, such resolution (or reference chasing) may be performed entirely in-memory and thereby minimizing the impact of the referencing chasing on the overall performance on the query node.

The improvement to the data processing technology by various embodiments of the invention discussed above should be understood as being examples of improvements to the technology and should not be limit the invention is any manner.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for servicing query requests in a query system interacting with one or more clients through one or more networks, the method comprising:
    generating, by a first query node of a plurality of query nodes, a data flow graph for a data model using a plurality of metadata documents defining a metadata stored in a persistent storage through a database management system (DBMS), wherein the metadata is data used to define characteristics of the data model with which the data is associated, and wherein each of the metadata documents is associated with at most one consistency zone among a plurality of consistency zones in the persistent storage, wherein the persistent storage is partitioned into the consistency zones, the consistency zones comprising a dataspace of the persistent storage, the metadata document corresponds to a metadata element used by the query system, and the metadata element defines how a portion of the data is organized and is stored in the persistent storage as one or more of the metadata documents;
    in response to receiving a query request from a client, a subscription engine of the first query node, or a second query node of the plurality of query nodes, generating, by the first query node, a query response using the data flow graph and the data associated with the data model, wherein the first query node is a different query node of the plurality of query nodes than the second query node, and wherein the plurality of metadata documents are in a consistency zone in the persistent storage; and
    modifying, by the DBMS, the plurality of metadata documents in the consistency zone concurrently as part of a single atomic transaction in the consistency zone based on event data of a document event of a plurality of document events, the document event resulting from a client interacting with the query system,
    wherein the event data specifies modifications that occurred to the metadata using a metadata document among the metadata documents and includes a reference to other ones of the metadata documents, and the metadata document includes all document events that have been performed on the metadata element using the metadata document and a unique metadata document identifier that identifies the metadata in the consistency zone.

2. The method of claim 1, wherein at least one of the plurality of metadata documents is a consistency zone document, and wherein each of the other plurality of metadata documents is referenced in the consistency zone document.

3. The method of claim 1, wherein a metadata document of the plurality of metadata documents comprises the plurality of document events associated with the metadata document.

4. The method of claim 3, wherein the document event of the document events is associated with an event version number (EVN), wherein each document event in the consistency zone will have a uniquely identifiable EVN.

5. The method of claim 4, wherein the EVN orders the document event relative to all other document events in the consistency zone.

6. The method of claim 1, further comprising generating the data flow graph by:
    obtaining a consistency zone document associated with the data model, wherein the consistency zone document is one of the plurality of metadata documents;
    determining, using the consistency zone document, a second plurality of metadata documents to obtain, wherein the plurality of metadata documents comprises the second plurality of metadata documents;
    obtaining the second plurality of metadata documents from persistent storage; and
    generating the data flow graph by processing the second plurality of metadata documents.

7. The method of claim 6, wherein the second plurality of metadata documents comprises a data space document and a dimension document.

8. The method of claim 6, wherein obtaining the consistency zone document comprises obtaining only a subset of document events in the consistency zone document.

9. The method of claim 6, wherein obtaining the second plurality of metadata documents comprises obtaining at least a portion of the second plurality of metadata documents in parallel.

10. The method of claim 6, wherein the consistency zone document comprises the reference.

11. The method of claim 10, wherein the reference specifies a particular event version number (EVN) of the other ones of the metadata documents.

12. The method of claim 6, wherein determining, using the consistency zone document, the second plurality of metadata documents to obtain comprises:
    generating an in-memory data structure for the consistency zone by processing, in EVN-order, the document events in the consistency zone document; and
    determining the second plurality of metadata documents using the in-memory data structure.

13. The method of claim 1, further comprising:
    in response to a request from a client of the query system, monitoring, by the subscription engine of the first query node, a plurality of query requests including user data;

receiving, by the subscription engine of the first query node, a notification from the DBMS that a user data of a particular query request has changed;

processing, by the subscription engine of the first query node, the notification to determine whether the user data that has changed is associated with any of the monitored query requests; and in response to the subscription engine determining that the user data has changed, notifying, by the subscription engine, the client with the request to monitor the plurality of query requests to enable the client with the request to monitor the plurality of query requests to issue a corresponding query request to the query system.

14. A non-transitory computer readable medium comprising computer readable program code, which when executed by a computer processor enables the computer processor to perform a method for servicing query requests, the method comprising:

generating, by a first query node of a plurality of query nodes of a query system interacting with one or more clients through one or more networks, a data flow graph for a data model using a plurality of metadata documents, the plurality of metadata documents defining a metadata stored in a persistent storage through a database management system (DBMS), wherein the metadata is data used to define characteristics of the data model with which the data is associated, and wherein each of the metadata documents is associated with at most one consistency zone among a plurality of consistency zones in a persistent storage, wherein the persistent storage is partitioned into the consistency zones, the consistency zones comprising a dataspace of the persistent storage, the metadata document corresponds to a metadata element used by the query system, and the metadata element defines how a portion of the data is organized and is stored in the persistent storage as one or more of the metadata documents;

in response to receiving a query request from a client, a subscription engine of the first query node, or a second query node of the plurality of query nodes, generating, by the first query node, a query response using the data flow graph and the data associated with the data model, wherein the first query node is a different query node of the plurality of query nodes than the second query node, and wherein the plurality of metadata documents are in a consistency zone in the persistent storage; and modifying, by the DBMS, the plurality of metadata documents in the consistency zone concurrently as part of a single atomic transaction in the consistency zone based on event data of a document event of a plurality of document events, the document event resulting from a client interacting with the query system, wherein the event data specifies modifications that occurred to the metadata using a metadata document among the metadata documents and includes a reference to other ones of the metadata documents, and the metadata document includes all document events that have been performed on the metadata element using the metadata document and a unique metadata document identifier that identifies the metadata in the consistency zone.

15. The non-transitory computer readable medium of claim 14, wherein at least one of the plurality of metadata documents is a consistency zone document, and wherein each of the other plurality of metadata documents is referenced in the consistency zone document.

16. The non-transitory computer readable medium of claim 14, wherein a metadata document of the plurality of metadata documents comprises a plurality of document events associated with the metadata document, wherein a document event of the document events of the metadata document of the plurality of metadata documents is associated with an EVN, and wherein the EVN orders the document event relative to all other document events in the consistency zone.

17. The non-transitory computer readable medium of claim 14, further comprising generating the data flow graph by:

obtaining a consistency zone document associated with the data model, wherein the consistency zone document is one of the plurality of metadata documents;

determining, using the consistency zone document, a second plurality of metadata documents to obtain, wherein the plurality of metadata documents comprises the second plurality of metadata documents;

obtaining the second plurality of metadata documents from persistent storage; and generating the data flow graph by processing the second plurality of metadata documents, wherein the second plurality of metadata documents comprises a data space document and a dimension document.

18. The non-transitory computer readable medium of claim 17, wherein obtaining the consistency zone document comprises obtaining only a subset of document events in the consistency zone document.

19. The non-transitory computer readable medium of claim 17, wherein obtaining the second plurality of metadata documents comprises obtaining at least a portion of the second plurality of metadata documents in parallel.

20. The non-transitory computer readable medium of claim 17, wherein the consistency zone document comprises a reference to a metadata document of the plurality of metadata documents and wherein the reference specifies a particular EVN of another metadata document.

21. The non-transitory computer readable medium of claim 17, wherein determining, using the consistency zone document, the second plurality of metadata documents to obtain comprises:

generating an in-memory data structure for the consistency zone by processing, in EVN-order, the document events in the consistency zone document; and determining the second plurality of metadata documents using the in-memory data structure.

* * * * *